United States Patent
Takagi et al.

(10) Patent No.: US 11,757,099 B2
(45) Date of Patent: *Sep. 12, 2023

(54) ION CONDUCTIVE LAYER AND METHODS OF FORMING

(71) Applicant: SAINT-GOBAIN CERAMICS & PLASTICS, INC., Worcester, MA (US)

(72) Inventors: Yuto Takagi, Natick, MA (US); Chuanping Li, Shrewsbury, MA (US); Ruofan Wang, Natick, MA (US); Michael McGahan, Middletown, RI (US); Vladimir Ouspenski, Saint-Pierre-lè-Nemours (FR); Jeremy Flamanc, Aix-en-Provence (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,605

(22) Filed: May 2, 2022

(65) Prior Publication Data
US 2022/0255079 A1 Aug. 11, 2022

Related U.S. Application Data

(63) Continuation of application No. 17/239,307, filed on Apr. 23, 2021.

(60) Provisional application No. 63/014,260, filed on Apr. 23, 2020.

(51) Int. Cl.
*H01M 4/60* (2006.01)
*H01M 4/38* (2006.01)
(Continued)

(52) U.S. Cl.
CPC .......... *H01M 4/604* (2013.01); *H01M 4/366* (2013.01); *H01M 4/382* (2013.01);
(Continued)

(58) Field of Classification Search
CPC .. H01M 2300/08; H01M 4/604; H01M 4/366; H01M 4/382; H01M 10/0525;
(Continued)

(56) References Cited

U.S. PATENT DOCUMENTS 7,824,795 B2 11/2010 Yoshida et al.
8,252,260 B2 8/2012 Itis
(Continued)

FOREIGN PATENT DOCUMENTS

CN 108701860 A 10/2018
CN 109775744 A 5/2019
(Continued)

OTHER PUBLICATIONS

International Search Report and Written Opinion for PCT/US2021/028912, dated Aug. 12, 2021, 10 pages.
(Continued)

*Primary Examiner* — Matthew W Van Oudenaren
(74) *Attorney, Agent, or Firm* — Abel Schillinger, LLP; Adrian Lawrence

(57) ABSTRACT

A solid ion conductive layer can include a foamed matrix and an electrolyte material including a hygroscopic material. In an embodiment, the electrolyte material can include a halide-based material, a sulfide-based material, or any combination thereof. In another embodiment, the solid ion conductive layer can include total porosity of at least 30 vol % for a total volume of the solid ion conductive layer.

20 Claims, 6 Drawing Sheets

(51) Int. Cl.
*H01M 4/36* (2006.01)
*H01M 10/0562* (2010.01)
*H01M 10/0525* (2010.01)
*H01M 4/02* (2006.01)

(52) U.S. Cl.
CPC ... *H01M 10/0525* (2013.01); *H01M 10/0562* (2013.01); *H01M 2004/021* (2013.01); *H01M 2300/008* (2013.01); *H01M 2300/0088* (2013.01)

(58) Field of Classification Search
CPC .......... H01M 10/0562; H01M 10/052; H01M 2004/021; H01M 2300/008; H01M 2300/0088; H01M 2300/0065; H01M 2300/0068; H01M 2300/0085; H01M 2300/0091; H01M 2300/0094
See application file for complete search history.

(56) References Cited

U.S. PATENT DOCUMENTS

| | | |
|---|---|---|
| 8,304,115 B1 | 11/2012 | Petkov et al. |
| 8,323,820 B2 | 12/2012 | Visco et al. |
| 9,419,299 B2 | 8/2016 | Visco et al. |
| 9,599,727 B2 | 3/2017 | Ouspenski et al. |
| 10,374,254 B2 | 8/2019 | Van Berkel et al. |
| 2006/0104880 A1* | 5/2006 | Iltis .................... C04B 35/5152 252/301.4 H |
| 2007/0117026 A1 | 5/2007 | Kumar et al. |
| 2009/0226816 A1 | 9/2009 | Yoshida et al. |
| 2010/0104948 A1* | 4/2010 | Skotheim .......... H01M 10/0562 429/204 |
| 2013/0202971 A1 | 8/2013 | Zhao et al. |
| 2014/0099538 A1 | 4/2014 | Johnson et al. |
| 2014/0287305 A1 | 9/2014 | Wachsman et al. |
| 2015/0147619 A1 | 2/2015 | Chae et al. |
| 2015/0111110 A1 | 4/2015 | Wanatabe et al. |
| 2017/0155169 A1 | 6/2017 | Hitz et al. |
| 2018/0166759 A1 | 6/2018 | Zhamu et al. |
| 2018/0205112 A1* | 7/2018 | Thomas-Alyea ... H01M 4/0404 |
| 2018/0219251 A1 | 8/2018 | Rogren |
| 2018/0301754 A1 | 10/2018 | Badding et al. |
| 2019/0020024 A1 | 1/2019 | Wang et al. |
| 2019/0088995 A1 | 3/2019 | Asano et al. |
| 2019/0148733 A1 | 5/2019 | Oura |
| 2019/0229328 A1 | 7/2019 | Cho et al. |
| 2019/0379056 A1 | 12/2019 | Chen |
| 2020/0044284 A1 | 2/2020 | Fujino et al. |
| 2020/0168904 A1 | 5/2020 | Nomoto |
| 2021/0143472 A1* | 5/2021 | Mimura .................... C08F 8/34 |
| 2021/0269323 A1* | 9/2021 | Kubo ................ H01M 10/0525 |
| 2021/0320326 A1 | 10/2021 | Ouspenski et al. |
| 2021/0320327 A1 | 10/2021 | Ouspenski et al. |
| 2021/0336263 A1 | 10/2021 | Wang et al. |
| 2021/0367263 A1* | 11/2021 | Lee .................. H01M 10/0562 |
| 2021/0376379 A1 | 12/2021 | Osada et al. |
| 2022/0181637 A1 | 6/2022 | Jang |
| 2022/0190437 A1 | 6/2022 | Jang |
| 2022/0263091 A1 | 8/2022 | Wang et al. |

FOREIGN PATENT DOCUMENTS

| | | | |
|---|---|---|---|
| CN | 109980290 A | | 7/2019 |
| CN | 110100333 A | | 8/2019 |
| CN | 110265708 A | | 9/2019 |
| CN | 110350238 A | | 10/2019 |
| CN | 110498995 | * | 11/2019 |
| CN | 110498995 A | * | 11/2019 |
| CN | 110534795 A | | 12/2019 |
| DE | 102016216555 | * | 3/2018 |
| DE | 102016216555 A1 | * | 3/2018 |
| DE | 102018205299 A1 | | 10/2019 |
| EP | 3168914 A1 | | 5/2017 |
| EP | 3419098 B1 | | 11/2017 |
| EP | 3496202 A4 | | 8/2019 |
| EP | 3496202 A1 | | 12/2019 |
| JP | 2511947 B2 | | 7/1996 |
| JP | 2003002974 A | | 1/2003 |
| JP | 2005089682 A | | 4/2005 |
| JP | 2006244734 A | | 9/2006 |
| JP | 2008300269 A | | 12/2008 |
| JP | 2009238739 A | | 10/2009 |
| JP | 2010212058 A | | 9/2010 |
| JP | 2018025582 A1 | | 5/2019 |
| JP | 2019145489 A | | 8/2019 |
| KR | 19990063878 A | | 7/1999 |
| KR | 20150015306 A | | 2/2015 |
| KR | 20150031288 A | | 3/2015 |
| KR | 20180046574 A | | 5/2018 |
| KR | 20180076132 A | | 7/2018 |
| KR | 20180115130 A | | 10/2018 |
| WO | 2009108184 A1 | | 9/2009 |
| WO | 2013125485 A1 | | 8/2013 |
| WO | 2014036090 A1 | | 3/2014 |
| WO | 2014052439 A1 | | 4/2014 |
| WO | 2015144074 A1 | | 10/2015 |
| WO | 2016069749 A1 | | 5/2016 |
| WO | 2017116599 A2 | | 7/2017 |
| WO | 2017192163 A1 | | 11/2017 |
| WO | 2017215736 A1 | | 12/2017 |
| WO | 2018002303 A1 | | 1/2018 |
| WO | 2018025582 A1 | | 2/2018 |
| WO | 2018085847 A1 | | 5/2018 |
| WO | 2018183771 A1 | | 10/2018 |
| WO | 2019135315 A1 | | 7/2019 |
| WO | 2019135316 A1 | | 7/2019 |
| WO | 2019135317 A1 | | 7/2019 |
| WO | 2019135318 A1 | | 7/2019 |
| WO | 2019135319 A1 | | 7/2019 |
| WO | 2019135320 A1 | | 7/2019 |
| WO | 2019135321 A1 | | 7/2019 |
| WO | 2019135322 A1 | | 7/2019 |
| WO | 2019135323 A1 | | 7/2019 |
| WO | 2019135328 A1 | | 7/2019 |
| WO | 2019135336 A1 | | 7/2019 |
| WO | 2019135341 A1 | | 7/2019 |
| WO | 2019135342 A1 | | 7/2019 |
| WO | 2019135343 A1 | | 7/2019 |
| WO | 2019135344 A1 | | 7/2019 |
| WO | 2019135345 A1 | | 7/2019 |
| WO | 2019135346 A1 | | 7/2019 |
| WO | 2019135347 A1 | | 7/2019 |
| WO | 2019135348 A1 | | 7/2019 |
| WO | 2019146216 A1 | | 8/2019 |
| WO | 2019146217 A1 | | 8/2019 |
| WO | 2019146218 A1 | | 8/2019 |
| WO | 2019146219 A4 | | 8/2019 |
| WO | 2019146236 A1 | | 8/2019 |
| WO | 2019146292 A1 | | 8/2019 |
| WO | 2019146293 A1 | | 8/2019 |
| WO | 2019146294 A1 | | 8/2019 |
| WO | 2019146295 A1 | | 8/2019 |
| WO | 2019146296 A1 | | 8/2019 |
| WO | 2019146308 A1 | | 8/2019 |
| WO | 2016197006 A1 | | 12/2019 |
| WO | 2019240547 A1 | | 12/2019 |
| WO | WO-2019240507 A1 | * | 12/2019 ............. A61K 35/28 |
| WO | 2020022205 A1 | | 1/2020 |
| WO | WO-2020022205 A1 | * | 1/2020 ........ C08F 220/1811 |
| WO | 2020137189 A1 | | 7/2020 |
| WO | 2021211711 A1 | | 10/2021 |
| WO | 2021211763 A1 | | 10/2021 |
| WO | 2021217045 A1 | | 10/2021 |
| WO | 2021217075 A1 | | 10/2021 |

OTHER PUBLICATIONS

International Search Report and Written Opinion for PCT/US2021/028950, dated Aug. 9, 2021, 12 pages.
International Search Report and Written Opinion for PCT/US2021/027289, dated Jul. 26, 2021, 12 pages.

(56) References Cited

OTHER PUBLICATIONS

International Search Report and Written Opinion for PCT/US2021/027359, dated Aug. 3, 2021, 14 pages.
Solid Polymner—an overview, ScienceDirect, https://www.sciencedirect.com/topics/engineering/solid-polymer, accessed Apr. 20, 2021; 13 pages.
Advanced Technologies R-2360, RTV silicone foam, Avantor, Dec. 2018, 3 pages.
Advanced Technologies R-2370, RTV silicone foam, Avantor, Dec. 2018, 2 pages.
Development of Roll-to-Roll Simultaneous Multilayer Deposition Methods for Solid-State Electrochemical Devices Using Highly Particulate Loaded Aqueous Inks: U.S. Department of Energy, Office of Energy Efficiency & Renewal Energy, Dec. 2019, 2 pages.
Ahmad, N.H. et al., "Ionic Conductivity and Electrical Properties of Carboxymethyl Cellulose—NH4CI Solid Polymer lectrolytes," Journal of Engineering Science and Technology, Aug. 2016, vol. 11(8), pp. 1-10.
Asano, T. et al. "Solid Halide Electrolytes with High Lithium-Ion Conductivity for Application in 4 V Class Bulk-Type All-Solid-State Batteries," Advanced Materials, 30 (2018), abstract only.
Bohnsack, A. et al.: "Ternary Halides of the A3 Mx 6 Type. VI. Ternary Chlorides of the Rare-Earth Elements with Lithium, Li3MCl6(M=Tb-Lu, Y, Sc): Synthesis, Crystal Structures, and Ionic Motion," Physical Inorganic Chemistry, vol. 623, 1997, abstract only.
Bohnsack, A. et al., "Ternary Halides of the A3MX6 Type. VII. The Bromides Li3MBr6 (M=Sm-Lu, Y) : Synthesis, Crystal Structure, and Ionic Mobility", Physical Inorganic Chemistry, vol. 623, 1997, abstract only.
Choi, S. et al., "Bio-inspired Self-Healing Electrolytes for Li—S Batteries," Chem 3, 2017, pp. 383-389.
Choudhury, S. et al., "Sollid State polymer electrolytes for high-performance lithium metal batteries," Nature Communications, 2019, V.10, pp. 1-8.
Collins, S.C. et al. "Lithium Chloride and Ammonia Complexes," Journal of Physical Chemistry, vol. 32, 11, 1928, pp. 1705-1719, first page only.
Amprikis, T. et al., "Fundamentals of inorganic solid-state electrolytes for batteries." Natute Materials, 2019, 14 pages.
Feinauer, M. et al. "Unlocking the Potential of Fluoride-Based Solid Electrolytes for Solid-State Lithium Batteries," ACS Appl. Energy Mater. 2019, V.2, N 10, pp. 7196-7203, abstract only.
Fuller, R. et al. "Electrical Conductivity in NH4CI and ND4CI Single Crystals," Journal of Physics and Chemistry of Solids, 31 (1970), pp. 1539-1545.
Fuzlin, A. F. et al., "Effect on Ammonium Bromide in dielectric behavior based Alginate Solid Biopolymer electrolytes," IOP Conf. Series: Materials Science and Engineering, 342, 2018, pp. 1-8.
Hitz, Gregory T. et al. "High-rate lithium cycling in a scalable trilayer Li-garnet-electrolyte architecture," Materials Today, vol. 22, Jan.-Feb. 2019, abstract only.
"Hayamizu, Kikuko et al. ""Relationship between Li+ diffusion and ion conduction for single-crystal and powder garnet-type electrolytes studied by 7Li PGSE NMRspectroscopy,"" Phys. Chem. Chem. Phys., 2019, 21, 23589-23597."
Homann, Gerrit et al. "Poly(Ethylene Oxide)-based Electrolyte for Solid-State-Lithium-Batteries with High Voltage Positive Electrodes: Evaluating the Role of Electrolyte Oxidation in Rapid Cell Failure," Scientific Reports, 10, Mar. 2020, 9 pages.
Kataoka, Kunimitsu et al. "Lithium-ion conducting oxide single crystal as solid electrolyte for advanced lithium battery application," Scientific reports, 2018, pp. 1-9.
Kerman, Kian et al., "Review—Practical Challenges Hindering the Development of Solid State Li Ion Batteries," Journal of The Electrochemical Society, 164 (2017), pp. A1731-A1744.
Lau, J. et al., "Sulfide Solid Electrolytes for Lithium Battery Applications," Advanced Energy Materials, 2018, 8, pp. 1-24.

Lee, K. et al., "Selection of binder and solvent for solution-processed all-solid-state battery," Journal of the Electrochemical Society, 164(9), 2017, pp. A2075-A2081 (abstract only).
Li, Xiaona et al. "Progress and perspectives on halide lithium conductors for all-solid-state lithium batteries," Energy & Enviromental Science, vol. 13, Royal Society of Chemistry, Mar. 3, 2020, pp. 1429-1461.
Li, X. et al., "Air-stable Li3InCl6 electrolyte with high voltage compatibility for all-solid-state batteries," Energy & Environmental Science 12(9), 2019, pp. 2665-2671.
Li, X. et al., "Water-Mediated Synthesis of a Superionic Halide Solid Electrolyte," Angew Chem Int Ed Engl., 2019, 58, pp. 16427-16432.
Liu, Boyang et al. "3D lithium metal anodes hosted in asymmetric garnet frameworks toward high energy density batteries" Energy Storage Materials 14 (2018) pp. 1-32.
Meyer, G. et al., "An Analysis of the Ammonium Chloride Route to Anhydrous Rare-Earth Metal Chlorides," Materials Research Bulletin, vol. 17, 1982, pp. 1447-1455, abstract only.
Meyer, G. et al., "Simple and Complex Halides," Handbook on the Physics and Chemistry of Rare Earths, vol. 28, 2000, pp. 53-129.
Meyer, Gerd et al. "The Amomonium-Bromide Route to Anhydrous Rare Earth Bromides Mbr3" Journal of the Less-Common Metals, 127, 1987, pp. 155-160.
Mo, Yifei,, "Solid Electrolyte Chemistry with Fast Ion Conduction and Good Electrochemical Stability: Insights from First Principles Computation," Department of Materials Science and Engineering, Maryland Energy Innovation Institute, University of Maryland, College Park, MD, 16 pages.
Muy, Sokseiha et al., "High-Throughput Screening of Solid-State Li-Ion Conductors Using Lattice-Dynamics Descriptors," iScience, vol. 16, 2019, pp. 270-282.
Owens, Boone B. et al., "High-conductivity solid electrolytes: MAg4I5." Science, vol. 157, Issue 3786 (1967), pp. 308-310, abstract only.
Park, K-H. et al., "High-Voltage Superionic Halide Solid Electrolytes for All-Solid-State Li-Ion Batteries," ACS Energy Letters, Jan. 30, 2020, 5, pp. 533-539.
Quinzeni, I. et al., "Stability of low-temperature Li7La3Zr2O12 cubic phase: The role of temperature and atmosphere," Materials Chemistry and Physics, 2017, V. 185, pp. 55-64, abstract only.
Riphaus, Nathalie, et al. "Slurry-Based Processing of Solid Electrolytes: A Comparative Binder Study." Journal of The Electrochemical Society, 165 (16), 2018, pp. A3993-A3999.
Samson, A. J., et al., "A bird's-eye view of Li-stuffed garnet-type Li7La3Zr2O12 ceramic electrolytes for advanced all-solid-state Li batteries," Energy & Environmental Science, Issue 10, 2019, abstract only.
Samsudin, A.S. et al., "Ionic conduction study of enhanced amorphous solid bio-polymer electrolytes based carboxymethyl cellulose doped NH4Br," Journal of Non-Crystalline Solids, 2018, V. 497, pp. 19-29, abstract only.
Schlem, R. et al., "Mechanochemical Synthesis: A Tool to Tune Cation Site Disorder and Ionic Transport Properties of Li3MCl6 (M=Y, Er) Superionic Conductors," Advanced Energy Materials, 2019, pp. 1-10.
Seifert, H. J. "Ternary chlorides of the trivalent late lanthanides Phase diagrams, crystal structures and thermodynamic properties," Journal of Thermal Analysis and Calorimetry, vol. 83, issue 2, 2006, abstract only.
Shao, C. et al.,"Structure and ionic conductivity of cubic Li7La3Zr2O12 solid electrolyte prepared by chemical co-precipitation method," Solid State Ionics , 2016, V. 287, pp. 13-16.
Sit, Y. K., "Ionic Conductivity Study on Hydroxyethyl Cellulose (HEC) doped with NH4Br Based Biopolymer Electrolytes," Research Journal of Recent Sciences, vol. 1 (11), 2012, pp. 16-21.
Steiner, H-J. et al., "Neue schnelle Ionenleiter vom Typ MMIIICl6 (Mi=Li, Na, Ag; MIII=In, Y)" Zeitschrift für anorganische und allgemeine Chemie 613 (1992), pp. 26-30.
Sun, Y. et al., "Thermodynamic optimization and calculation of the YCl3-ACl (A=Li, Na, K, Rb, Cs) phase diagrams." Calphad, vol. 39 (2012), pp. 1-10.

(56) References Cited

OTHER PUBLICATIONS

Tan, Darren H.S. et al. "Enabling thin and flexible solid-state composite electrolytes by the scalable solution process," ACS Applied Energy Materials, 2019, 2(9), pp. A-I.

Tang, Haolin et al. "Porosity-graded micro-porous layers for polymer electrolyte membrane fuel cells," Science Direct, Journal of Power Sources 166, 2007, pp. 41-46.

Wang, C. et al., "Stabilizing interface between Li10SnP2S12 and Li metal by molecular layer deposition," Nano Energy (2018), V.53, pp. 168-174.

Wang, S. et al., "Lithium Chlorides and Bromides as Promising Solid-State Chemistries for Fast Ion Conductors with Good Electrochemical Stability." Angewandte Chemie International Edition, 58.24 (2019), 8039-8043.

Wentker, M. et al., "Bottom-Up Approach to Lithium-Ion Battery Cost Modeling with a Focus on Cathode Active Materials," Energies, 2019, 12, 504, pp. 1-18.

Writer, B. "Anode Materials, SEI, Carbon, Graphite, Conductivity, Graphene, Reversible, Formation." In: Lithium-Ion Batteries. Springer, Cham, 2019, abstract only.

Wu, J-F. et al., "Garnet-Type Fast Li-Ion Conductors with High Ionic Conductivities for All-Solid-State Batteries," ACS Appl. Mater. Interfaces 2017, V.9, pp. 12461-12468, abstract only.

Xue, W. et al.,"The effect of sintering process on lithium ionic conductivity of $Li6.4Al0.2La3Zr2O12$ garnet produced by solid-state synthesis," The Royal Society of Chemistry Adv, 2018, V.8, pp. 13083-13088.

Yamamoto, Mari et al. "Binder-free sheet-type all-solidstate batteries with enhanced rate capabilities and high energy densities," Scientific Reports, 2018, 10 pages.

Zhang, Tengfei et al., "Ammonia, a Switch for Controlling High Ionic Conductivity in Lithium Borohydride Ammoniates," Joule 2, Elsevier Inc., 2018, pp. 1522-1533.

Zhang, Z. et al., "New horizons for inorganic solid state ion conductors," Energy & Environmental Science, 2018, V.11, pp. 1945-1976.

Zhao, Y. et al., "Superionic Conductivity in Lithium-Rich Anti-Perovskites," Journal of the American Chemical Society 134(36), (2012), abstract only.

Takada, Kazunori, "Progress in solid electrolytes toward realizing solid-state lithium batteries," Journal of Power Sources, 394, (2018), pp. 74-85.

Dondelinger, Matthew et al. "Electrochemical stability of lithium halide electrolyte with antiperovskite crystal structure," Electrochimica Acta, 306, (2019), pp. 498-505.

Electronic Polymers, Encapsulating Systems, Araldite Casting Resin System, Vantico LTD., 2000, 6 pages.

Ulvestad, Andrew "A Brief Review of Current Lithium Ion Battery Technology and Potential Solid State Battery Technologies," Applied Physics, 2018, 17 pages.

Nagel, R. et al., "6Li and 7Li MAS NMR Studies on Fast Ionic Conducting Spinel-Type $Li2MgCl4$, $Li2-xCuxMgCl4$, $Li2-xNaxMgCl4$, and $Li2ZnCl4$," Journal of Solid State Chemistry 165 (2002),pp. 303-311.

Functional Products, Capture LOF, Cognis, 2009, 3 pages.

\* cited by examiner

ION CONDUCTIVE LAYER AND METHODS OF FORMING

CROSS-REFERENCE TO RELATED APPLICATION(S)

This application is a continuation of and claims priority under 35 U.S.C. § 120 to U.S. patent application Ser. No. 17/239,307, entitled "ION CONDUCTIVE LAYER AND METHODS OF FORMING," by Yuto TAKAGI et al., filed Apr. 23, 2021, which claims priority under 35 U.S.C. § 119(e) to U.S. Provisional Application No. 63/014,260 entitled "ION CONDUCTIVE LAYER AND METHODS OF FORMING," by Yuto TAKAGI et al., filed Apr. 23, 2020, all of which are assigned to the current assignee hereof and incorporated herein by reference in their entireties.

FIELD OF THE DISCLOSURE

The following is directed to an ion conductive layer and methods of forming the same, and to, in particular, a solid ion conductive layer and methods of forming the same.

DESCRIPTION OF THE RELATED ART

Solid-state lithium batteries are expected to provide higher energy densities and faster recharging times and cause fewer safety concerns compared to conventional lithium-ion batteries, by enabling lithium metal anode. Uses of solid-state electrolytes have been demonstrated to help improve the performance of lithium metal anodes.

The industry continues to demand solid-state batteries with improved performance.

BRIEF DESCRIPTION OF THE DRAWINGS

The present disclosure may be better understood, and its numerous features and advantages made apparent to those skilled in the art by referencing the accompanying drawings.

Figure 1:
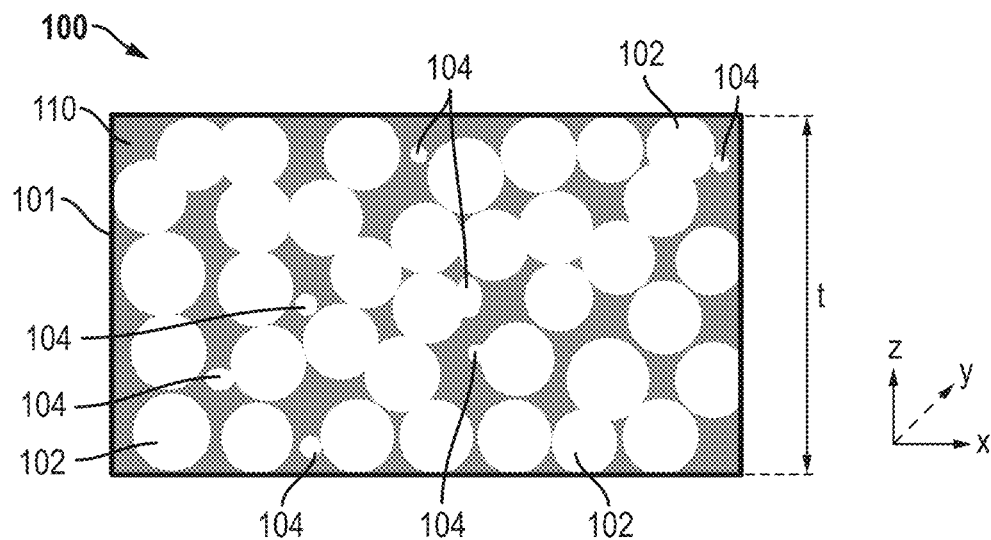
FIG. 1 includes an illustration of a cross-section of an ion conductive layer in accordance with an embodiment herein.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes", "including", "has", "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Embodiments herein relate to a solid ion conductive layer including an ion conductive material. In embodiments, the ion conductive material may be an electrolyte material. The electrolyte material can include a hygroscopic material. In particular instances, the electrolyte material can include a sulfide-based or halide-based electrolyte material having a bulk ion conductivity that is suitable for applications of a solid-state battery, such as a solid-state lithium-ion battery. In particular embodiments, the solid ion conductive layer can include a porous structure, such as a foamed matrix, including the electrolyte material. In embodiments, the ion conductive layer can be a composite layer further including an electron conductive material, such as an anode or cathode active material. In further embodiments, the ion conductive layer can be a component of an electrochemical device. For instance, the ion conductive layer can be formed into a composite layer including an anode, a cathode, or any combination thereof. In a particular embodiment, an electrochemical device can include a solid-state lithium-ion battery.

Embodiments further relate to methods of forming the solid ion conductive layer. The method can allow the formation of a porous structure including a halide-based or sulfide-based electrolyte material that is typically hygroscopic. The method can further allow the formation of controlled porosity and/or thickness of the solid ion conductive layer to suit applications of a solid-state battery.

In an embodiment, the solid ion conductive layer can include a foamed matrix including an electrolyte material. In an aspect, the electrolyte material can be embedded in the foamed matrix. In a further aspect, the electrolyte material can include a hygroscopic material. An exemplary hygroscopic electrolyte material can include a halide-based material, a sulfide-based material, or any combination thereof. In another aspect, the foamed matrix can include a hygroscopic electrolyte material.

In an embodiment, the foamed matrix can include a halide-based electrolyte material including a complex metal halide. In an aspect, the complex metal halide may be represented by $M_{3-\delta}(Me^{k+})_f X_{3-\delta+k*f}$ (Formula I), wherein $-3 \leq \delta < 3$; $0 \leq f \leq 1$; k is the valence of Me; and $2 \leq k < 6$. In a particular aspect, the complex metal halide may be represented by $M_{3-\delta}Me^{k+}X_{3-\delta+k}$, (Formula II), wherein $-0.95 \leq \delta \leq 0.95$.

M can include an alkali metal element including Li, Na, Rb, Cs, K, or any combination thereof. Me can include a divalent element, a trivalent element, a tetravalent element, a pentavalent element, a hexavalent element, or any combination thereof. In instances when Me is a combination of elements, k can be the average value of the total valences of the elements. For example, when Me includes x mole of a trivalent element and y mole of a tetravalent element, $k=(3x+4y)/(x+y)$. In the instance, Me includes a trivalent and tetravalent element in equal molar quantity, k=3.5. In more particular instances, k may be 3 or 4 or 5. X can include a halogen. In instances, X can include an anion group in addition to the halogen. Such anion group can include amide ($-NH_2$), hydroxide ($-OH$), $-BF_4$, $-BH_4$ (borohydride), or a combination thereof. The anion group may be included as an impurity or a dopant. In particular instances, X can consist of one or more halogens or a combination of one or more halogens and an anion group.

In particular instances, M can include Li. In an instance, M can include Li and another alkali metal element. In another example, M can consist of Li. In another example, M can consist of at least one of Li, Na, Cs, Rb, and K. In a particular instance, M can consist of Li, and at least one of Cs and Na.

A further example of Me can include an alkaline earth element, such as Mg, Ca, Sr, and/or Ba, a Group 12 element, such as Zn, or any combination thereof. With respect to Groups of elements noted in this disclosure, reference is made to the IUPAC Periodic Table of the Elements published on Dec. 1, 2018.

In another example, Me can include one or more trivalent elements. For example, Me can include a Group 13 element, such as In and/or Al, a Group 3 element, a rare earth element, such as Sc, Y, and/or a lanthanide, or any combination thereof. In still another example, Me can include one or more tetravalent element, such as a Group 4 element (i.e., Zr and/or Hf), Sn, one or more pentavalent element, such as a Group 5 element (i.e., Nb, and/or Ta), Bi, or any combination thereof. In a particular example, Me can include a rare earth element, such as Y, Sc, La, Ce, Pr, Nd, Pm, Sm, Eu, Tm, Gd, Tb, Dy, Ho, Lu, or any combination thereof.

In a particular aspect, the halide-based material may include $(Li_{1-d}Na_d)Li_2REX_6$ (Formula III), wherein RE is one or more rare earth elements, and $0 \leq d < 1$. A particular example of RE can include Y, Gd, Er, or a combination thereof. For instance, RE can consist of Y. In another particular instance, RE can consist of Y and at least one other rare earth element.

In another particular aspect, the halide-based material may include $Li_3Y_ZRE_{1-Z}X_6$ (Formula IV), wherein $0 < Z \leq 1$, RE is one or more rare earth element other than Y.

A particular example of a halide-based electrolyte material can include $Li_3YBr_6$, $Li_3YCl_6$, $Li_3(Al,Ga,In)X_6$, $(Li_{0.5}, Na_{0.5})_2LiYCl_6$, $Li_3YBr_6$, $Li_{2.5}Y_{0.5}Zr_{0.5}Cl_6$, $Li_3Y_{0.95}Sm_{0.05}Br_3Cl_3$, $Li_3Y_{0.9}Sm_{0.1}Br_3Cl_3$, $Li_3YBr_3Cl_3$, $Li_3Y_{0.9}Er_{0.1}Br_3Cl_3$, $Li_3Y_{0.9}Lu_{0.1}Br_3Cl_3$, $Li_3Y_{0.9}Tb_{0.1}Br_3Cl_3$, $Li_3Y_{0.95}Bi_{0.05}Br_6$, $Li_3Y_{0.9}Dy_{0.1}Br_3Cl_3$, $Li_3Y_{0.9}Eu_{0.1}Br_3Cl_3$, $Li_{3.1}Y_{0.9}Ba_{0.1}Br_6$, $Li_{2.8}Y_{0.9}Ta_{0.1}Br_2Cl_2I_2$, $Li_{3.2}Y_{0.9}Sr_{0.2}Br_6$, $LiCsCl_2$, $Li_3YCl_3Br_3$, or the like, or any combination thereof.

In another particular aspect, the halide-based electrolyte material can include an ammonium halide, such as $NH_4Cl$, $NH_4Br$, or a combination thereof. In particular instances, ammonium halide may be a dopant or an impurity present in a complex metal halide.

In another embodiment, the hygroscopic material can include lithium halides with an anti-perovskite crystal structure, a lithium oxyhalide, a lithium halide hydroxide, or a combination thereof. For instance, the hygroscopic material can include $Li_{3-x}M_{x/2}OA_{1-z}A'_z$, where A and A' are A-site halogens such as F, Cl, Br, or I. A particular example can include $Li_3OCl$, $Li_3OBr$, $Li_3O(Cl, Br)$ (e.g., $Li_3OCl_{0.5}Br_{0.5}$), $Li_2OHX$ (e.g., $Li_2OHCl$ and $Li_2OHBr$), or the like.

In another aspect, the electrolyte material can include a sulfide-based material. The sulfide-based material can include an amorphous phase, a crystalline phase, or any combination thereof. A particular example of the sulfide-based material can include, but not limited to, $xLi_2S-yP_2S_5$ (LPS), such as $0.67Li_2S-0.33P_2S_5$, $80Li_2S-20P_2S_5$, $75Li_2S-25P_2S_5$, $70Li_2S-30P_2S_5$, and the like, $Li_2S-X$, wherein X represents at least one sulfide of $SiS_2$, $GeS_2$, and $B_2S_3$, such as $0.50Li_2S-0.50GeS_2$, $LiI-Li_2S-SiS_2$, such as $0.40LiI-0.36Li_2S-0.24SiS_2$ and the like, $0.05Li_4SiO_4-0.57Li_2S-0.38SiS_2$, $Li_3PO_4-Li_2S-SiS_2$, such as $0.01Li_3PO_4-0.63Li_2S-0.36SiS_2$ and the like, $LiI-Li_2S-B_2S_3$, such as $0.44LiI-0.30Li_2S-0.26B_2S_3$ and the like, $LiI-Li_2S-P_2S_5$, such as $0.45LiI-0.37Li_2S-0.18P_2S_5$ and the like, $a-Li_3PS_4$, LGPS (e.g., $Li_{10}GeP_2S_{12}$), LPSCl (e.g., $Li_6PS_5Cl$), LPSBr (e.g., $Li_6PS_5Br$), LSPSCl (e.g., $Li_{9.54}Si_{1.74}P_{1.44}S_{11.7}Cl_{0.3}$), $Li_{10.35}[Sn_{0.27}Si_{1.08}]P_{1.65}S_{12}$, or any combination thereof.

In another embodiment, the electrolyte material can have a particular bulk ion conductivity that can facilitate the formation of improved performance of the solid ion conductive material. In an aspect, the electrolyte material can have a bulk ion conductivity of at least 0.1 mS/cm, 0.5 mS/cm, 1 mS/cm, at least 1.5 mS/cm, or at least 2 mS/cm. In another aspect, the electrolyte material can have a bulk ion conductivity of at most 50 mS/cm, at most 45 mS/cm, at most 40 mS/cm, at most 40 mS/cm, at most 40 mS/cm, at most 35 mS/cm, at most 30 mS/cm, at most 29 mS/cm, at most 25 mS/cm, at most 20 mS/cm, at most 15 mS/cm, at most 10 mS/cm, at most 5 mS/cm, at most 3 mS/cm, 2 mS/cm, or 1 mS/cm. Moreover, the electrolyte material can have a bulk ion conductivity in a range including any of the minimum and maximum values noted herein. As described herein, the bulk ion conductivity is measured at 23° C.

In a further embodiment, the solid ion conductive layer can include a particular content of the electrolyte material that can facilitate improved formation and property and/or performance of the solid ion conductive layer. In an aspect, the solid ion conductive layer can include at least 5 vol % of the electrolyte material for the total volume of the solid ion conductive layer, such as at least 7 vol %, at least 9 vol %, at least 10 vol %, at least 12 vol %, at least 15 vol %, at least 17 vol %, at least 19 vol %, at least 20 vol %, at least 25 vol %, at least 27 vol %, or at least 30 vol % for the total volume of the ion conductive layer. In another aspect, the solid ion conductive layer can include at most 70 vol % of the electrolyte material for the total volume of the solid ion conductive layer, such as at most 68 vol %, at most 65 vol % at most 60 vol %, at most 58 vol %, at most 55 vol %, at most 50 vol %, at most 48 vol %, at most 45 vol %, at most 42 vol %, at most 40 vol %, at most 38 vol %, at most 35 vol %, at most 30 vol %, at most 28 vol %, at most 25 vol %, at most 20 vol %, at most 15 vol %, at most 10 vol %, or at most 5 vol % for a total volume of the solid ion conductive layer. In another aspect, the electrolyte material can be in a content in a range including any of minimum and maximum percentages noted herein. For example, the solid ion conductive layer can include 20 vol % to 40 vol % of the electrolyte material for the total volume of the solid ion conductive layer.

In an embodiment, the solid ion conductive layer can include an organic material that can facilitate the improved formation and improved performance of the solid ion conductive layer. For example, the organic material can facilitate the formation of the solid ion conductive layer with an improved property. The property can include pore characteristics, thickness, ion conductivity, wettability of an electrode active material, chemical and physical compatibility, flexibility, chemical stability, electrochemical stability, mechanical strength, elasticity, plasticity, softness, or any combination thereof. An exemplary pore characteristic can include porosity, average pore sizes, pore shapes, pore orientation, aspect ratio, pore size distribution, surface area, or any combination thereof.

In an aspect, the organic material may have minimal or no reactivity to the electrolyte material in the process of forming the ion conductive layer, in the operation conditions that the solid ion conductive layer is applied, or both. For example, in the process of forming the solid ion conductive material, the organic material may cause little or no adverse effect on the composition, ionic conductivity, electron conductivity, electrochemical stability, or both of the electrolyte material.

In a particular aspect, the organic material can have a particular Reactivity Value that can facilitate the improved formation and improved property of the solid ion conductive layer. In an example, the organic material can have a Reactivity Value of at most 20% or less than 20%, such as at most 18%, at most 15%, at most 12%, or at most 10%. In further examples, organic material can have a Reactivity Value of less than 10%, such as at most 9%, at most 8%, at most 7%, at most 6%, at most 5%, at most 4%, at most 3%, or at most 2%. In another example, the organic material can have a Reactivity Value of 0% or greater than 0%, such as at least 0.01%, at least 0.1%, at least 0.2%, at least 0.3%, at least 0.5%, at least 0.8%, or at least 1%. Moreover, the Reactivity Value can be in a range including any of the minimum and maximum percentages noted herein. For example, the organic material can have a Reactivity Value of up to at most 2%. In particular implementations, the organic material may have a Reactivity Value of less than 20% for a halide-based material including $Li_3YBr_6$ or a halide-based material including a crystalline structure similar to $Li_3YBr_6$, such as a layered crystalline structure, or more particularly, a monoclinic crystalline structure. In another particular implementation, the organic material may have a Reactivity Value of less than 10% for a halide-based material including $Li_3YCl_6$ or a halide-based material including a crystalline structure similar to $Li_3YCl_6$, such as a crystalline structure of hexagonal or trigonal crystal system.

The Reactivity Value can be determined as follows. Reactivity Value of the organic material to the ion conductive material can be tested by mixing the solid ion conductive material with the organic material at a weight percentage ratio of 10:90 and keeping the mixture at not greater than 100° C., such as 20° C. to 60° C., in an inert atmosphere for at least 12 hours and up to 24 hours. X-ray diffraction analysis can be performed to detect a change to the XRD pattern, such as changes to the characteristic peak of the ionic conductive material and changes of other peaks between before and after the test. For example, the change can include the disappearance of the characteristic peak, changes to the intensity of the characteristic peak, changes to the intensity of characteristic peaks of certain impurity or degradation or decomposition product of the solid ion conductive material, or any combination thereof.

The Reactivity Value of the organic material may be tested and determined as follows. The organic material and the ion conductive material can be mixed at a weight percentage ratio of 70:30, wherein each of the ion conductive material is at 30 wt. % and the polymer is at 70 wt. % in the mixture for the total weight of the ion conductive material and the organic material. In instances, an inorganic catalyst of the organic material may be utilized for forming the solid ion conductive layer, and the mixture of the catalyst and the organic material may be used in lieu of the organic material for testing the Reactivity Value of the mixture of the catalyst and organic material. The mixture can be sealed in a gas-tight sample holder with a Kapton film window for performing an XRD analysis. The entire testing can be performed in a dry environment with $H_2O$ content <1 ppm. XRD analysis can be conducted from 25 to 80 degrees two theta, with a step size of 7.5° C. and step duration of 120 seconds rate, using an X-ray diffractometer.

The Reactivity Value of the organic material may be determined using the formula, $RV=[B/A]\times100\%$ based on the XRD pattern of the dry solid material, wherein A represents the intensity of the characteristic peak of the solid ion conductive material and B represents the intensity of the characteristic peak of a representative decomposition product of the solid ion conductive material. The representative decomposition product can be binary including lithium and the major anion atom of the ion conductive material. For example, lithium halide can be the representative decomposition product of the halide-based material of embodiments herein. Accordingly, A can be the characteristic peak of the halide-based material, and B can be the characteristic peak of lithium halide. Referring to FIG. 18, A and B are illustrated in the XRD pattern for testing the Reactivity Value of an organic material with $Li_3YBr_6$ in comparison with the XRD pattern of the original $Li_3YBr_6$. The characteristic XRD peak of $Li_3YBr_6$ typically appears between 31 and 32.2 degrees two theta, and the characteristic peak of LiBr between 27.9 and 28.5 degrees two theta. The characteristic peak of $Li_3YCl_6$ is between 40.5 and 41.5 degrees two theta, and LiCl between 34.5 and 35.5 degrees two theta. When the XRD pattern does not include the characteristic peak of the representative decomposition product of the ion conductive material, and A is not 0, the Reactivity Value of the organic material can be determined as 0. When the XRD pattern of the mixture of the organic material and ion conductive material does not include the characteristic peak of the ion conductive material, the Reactivity Value of the organic material can be determined as indefinite.

In instances, the XRD pattern of the original ion conductive material may include the characteristic peak of the representative decomposition product. For example, the halide-based material may include lithium halide as an impurity. In those instances, the XRD pattern of the original ion conductive material may be referenced to determine $RI_O$, wherein $RI_O=[b/a]\times100\%$, b represents the intensity of the characteristic peak of the decomposition product and a represents the intensity of the characteristic peak of the ion conductive material. The Reactivity Value (RV) of the organic material may be determined by the formula, $RV=RI_{DS}-RI_O$, wherein $RI_{DS}=[B/A]\times100\%$, B is the intensity of the characteristic peak of the decomposition product in the mixture, and A is the intensity of the characteristic peak of the ion conductive material in the mixture.

In an aspect, the organic material can have a particular Moisture Absorption Rate (referred to as "MAR" hereinafter) that can facilitate the improved formation and improved property of the solid ion conductive layer. In an example, the organic material can have a MAR of at most 1.0 wt. %, such as at most 0.8 wt. %, at most 0.5 wt. %, at most 0.3 wt. %, or at most 0.1 wt. %. In another example, the organic material can have MAR of 0 wt. % or at least 0.01 wt. % or at least 0.03 wt. %. In a further example, the organic material can have the MAR in a range including any of the minimum and maximum percentages noted herein. For example, the organic material can have MAR of up to 0.3 wt. %.

The MAR can be tested and determined as follows. A specimen of the organic material having a specified dimension can be placed in distilled water or exposed to humid air (i.e., 50% relative humidity) at 23° C. or 100° C. for 24 hours. Moisture Absorption Rate can be determined by the formula, $MAR=[(W_{AE}-W_{BE})/W_{BE}]\times100\%$, wherein $W_{BE}$ is the weight of the dried specimen, and $W_{AE}$ is the weight of the specimen prior to exposure to water or humid air. The specimen can be dried in an oven and then placed in a desiccator to cool. Immediately upon cooling the specimen is weighed to obtain $W_{BE}$. Alternatively, the MAR can be determined according to ASTM D570 or ISO 62.

In an aspect, the organic material can have a hydrophobic portion, a lipophilic portion, or a combination thereof. In a particular aspect, the organic material can have a particular hydrophile-lipophile balance (referred to as "HLB" hereinafter) value that can facilitate the improved formation and improved property of the solid ion conductive layer. In an example, the organic material can have an HLB value of at most 10, such as at most 9.6, at most 9, at most 8.8, at most 8.2, at most 7.6, at most 7.3, at most 7, at most 6.6, at most 6, at most 5.6, at most 5, at most 4.8, at most 4.2, at most 4, at most 3.8, at most 3.3, at most 3, at most 2.6, at most 2.2, at most 2, at most 1.5, at most 1, at most 0.5, or at most 0.1 In another example, the organic material can have an HLB value of 0 or higher, such as at least 0.001, at least 0.005, at least 0.01, at least 0.05, at least 0.0.08, or at least 0.1. In a further example, the organic material can have an HLB value in a range including any of the minimum and maximum values noted herein. For example, the organic material can have an HLB of up to 4.

The HLB value can be determined according to Griffin's Mathematical method using the formula, $HLB=20\times M_h/M$, wherein $M_h$ is the molecular mass of the hydrophilic portion of the organic material, and M is the molecular mass of the whole organic material. To aid understanding, using an exemplary scale of HLB of 0 to 20, an HLB value of 0 can correspond to a completely lipophilic/hydrophobic molecule, and a value of 20 can correspond to a completely hydrophilic/lipophobic molecule.

Exemplary hydrophilic groups can include N (Tertiary Amine), —COOH (Carboxyl), —O— (Ether), —OH (Hydroxyl), —COO— (Ester), C═O (Carbonyl), or any combination thereof. Exemplary lipophilic groups may include —C≡N (Nitrile), —CH$_3$ (Methyl), ═CH$_2$ (Methylene), —CH$_2$—, —CH═, —C$_6$H$_5$(Phenyl group), —F (Fluoro group), —Cl (Chloro group), or any combination thereof.

In an embodiment, the organic material can have a particular dielectric constant that can facilitate improved formation, property, and/or performance of the solid ion conductive layer. In an aspect, the organic material may have a dielectric constant of at most 35, such as at most 33, at most 31, at most 29, at most 26, at most 23, at most 20, at most 19, at most 17, at most 15, at most 13, at most 12, at most 11, at most 10.5, at most 10, at most 9, at most 8, at most 7, at most 6, at most 5, at most 4, at most 3, or at most 2. In another aspect, the organic material may have a dielectric constant of at least 0.5, such as at least 1, at least 2, at least 3, at least 4, or at least 5. Moreover, the organic material may include a dielectric constant in a range including any of the minimum and maximum values noted herein.

In particular embodiment, the organic material may include a particular HLB value, a particular Reactivity Value, a particular dielectric constant, or any combination thereof. In an aspect, the organic material may include a solvent material having an HLB value of 0, a Reactivity Value of at most 20%, a dielectric constant of at most 35, or any combination thereof. In particular instances, the organic material may include a solvent including an HLB value of 0, a Reactivity Value of less than 20%, and a dielectric constant of at most 12. A more particular example of an organic solvent can include heptane, cyclohexane, dibromomethane, dichloromethane, 1,2-dichloroethane, or any combination thereof.

In a further aspect, the organic material may include a binder material including a particular HLB value, a particular Reactivity Value, or any combination thereof. For example, the organic binder material may include an HLB value of less than 10 and a Reactivity Value of less than 20%. In another example, the organic binder material may include an HLB value of less than 10 and a Reactivity Value of less than 10%. A more particular example of an organic binder can include hydrogenated nitrile butadiene rubber, Styrene butadiene rubber, Polyisobutylene, Poly(vinylidene fluoride), Poly(acrylonitrile), Paraffin wax, Polyethylene, Polyvinyl chloride, Poly(ethylene oxide), Polyvinyl pyrrolidone, Poly(methyl methacrylate), or any combination thereof.

In an aspect, the organic material can include a polymer, such as a thermosetting polymer, thermoplastic polymer, or any combination thereof.

An example of the organic material can include one or more of paraffin wax, polyisobutylene, polyvinyl pyrrolidone, poly (methyl methacrylate), polyethylene glycol, camphene, urea, poly(acrylonitrile), polyethylene carbonate, polyvinyl chloride, poly(ethylene oxide), poly(propylene oxide), poly(vinylidene fluoride), poly(dimethylsiloxane), poly[bis(methoxy ethoxyethoxide)-phosphazene], polypropylene glycol, polycaprolactone, and poly(trimethylene carbonate), poly(methyl acrylate), poly(vinylidene fluoride)-co-hexafluoropropylene, poly(acrylonitrile-co-butadiene), poly(styrene-butadiene-styrene), and styrene-ethylene-butylene-styrene, styrene-butadiene rubber, hydrogenated nitrile butadiene rubber, high density polyethylene, low density polyethylene, poly(ethylene oxide), polystyrene, and polyurethane, or any combination thereof.

In another example, the organic material can include one or more polymer selected from the group consisting of poly(propylene oxide), poly(vinylidene fluoride), poly(dimethylsiloxane), poly[bis(methoxy ethoxyethoxide)-phosphazene], polypropylene glycol, polycaprolactone, and poly (trimethylene carbonate), poly(methyl acrylate), poly (vinylidene fluoride)-co-hexafluoropropylene, poly (acrylonitrile-co-butadiene), poly(styrene-butadienestyrene), and styrene-ethylene-butylene-styrene, hydrogenated nitrile butadiene rubber, high density polyethylene, low density polyethylene, poly(ethylene oxide), polystyrene, styrene-butadiene rubber, and polyurethane.

In a particular instance, the organic material can consist of a polymer including polyurethane, epoxy, or a combination thereof. In another particular instance, the organic material can include a polymer including siloxane. In another particular instance, the solid ion conductive layer can include polysiloxane. For example, the solid ion conductive layer can include a silicone-based polymer. In another example, the solid ion conductive layer can include a foamed matrix including silicone.

In an embodiment, the ion conductive layer can include a particular content of the organic material that can facilitate improved formation and performance of the ion conductive layer. For example, the ion conductive layer can include at least 1 vol % of the organic material for a total volume of the ion conductive layer, such as at least 2 vol %, at least 3 vol %, at least 4 vol %, at least 5 vol %, at least 10 vol %, at least 15 vol %, at least 20 vol %, at least 25 vol %, at least 30 vol %, or at least 35 vol %. In another example, the ion conductive layer may include at most 50 vol % of the organic material for the total volume of the ion conductive layer, such as at most 48 vol %, at most 45 vol %, at most 40 vol %, at most 36 vol %, at most 30 vol %, at most 25 vol %, at most 20% vol %, at most 15 vol %, at most 10 vol %, at most 8 vol %, at most 7 vol %, at most 6 vol %, or at most 5 vol % for the total volume of the ion conductive layer. Moreover, the content of the organic material may be in a range including any of the minimum and maximum percentages noted herein. For example, the ion conductive layer can include at least 5 vol % and at most 15 vol % of the organic material for a total volume of the ion conductive layer.

In a further embodiment, the ion conductive layer can include a particular ratio of the content of the electrolyte material to the content of the organic material. In an aspect, the ion conductive layer can include a ratio of $V_E:V_O$, wherein $V_O$ is a volume percent of the organic material relative to the total volume of the solid ion conductive layer, and $V_E$ is a volume percent of the electrolyte material relative to the total volume of the solid ion conductive layer. In an example, the ratio of $V_E:V_O$ can be at least 0.5, at least 1, at least 1.2, at least 1.5, at least 2, at least 2.5, or at least 3. In another instance, the ratio of $V_E:V_O$ can be at most 15, at most 12, at most 10, at most 9, at most 8, at most 7, at most 6, at most 5, at most 4, at most 3, or at most 2. For example, $V_E:V_O$ can be at least 2.5 and at most 12. In a further example, the ratio of $V_E:V_O$ can be in a range including any of the minimum and maximum values noted herein.

In a particular embodiment, the solid ion conductive layer can include a polymer that can be a reaction product of a foaming system. An exemplary foaming system can include an organic precursor, a crosslinking agent, and a foaming agent. In certain instances, the foaming system may include a catalyst. In further instances, a foaming system may include a base resin, a plasticizer, and a foaming agent. In an aspect, each component of the foaming system can be hydrophobic. In another aspect, each component of the foaming system can have an HBL value noted in embodiments herein, a MAR noted in embodiments herein, a Reactivity Value noted in embodiments herein, or any combination thereof.

In an embodiment, the solid ion conductive layer can include a polymer including siloxane. In a particular aspect, the solid ion conductive layer can include silicone. In particular instances, the solid ion conductive layer can include a foamed matrix resulted from a foaming system including a polymer including silicone, a cross-linking agent, a catalyst, and a foaming agent. An example of silicone can include polydimethylsiloxane (PDMS), vinyl-terminated PDMS, hydride functional siloxanes, methylhydrosiloxane-dimethylsiloxane copolymer, or any combination thereof. In particular examples, the solid ion conductive material can include a catalyst for the silicone material. The catalyst may include an inorganic material, such as metal. A particular example of the catalyst can include an inert metal. Another particular example of the catalyst can include platinum, platinum complex, or any combination thereof. In particular instances, the catalyst may be in a solvent material, such as xylene. In a particular implementation, the catalyst can include a complex of platinum in xylene. In instances, the solid ion conductive layer can include a crosslinking agent such as PDMS-co-PHMS. A blowing agent may include mono- or di-functional silanol, or benzyl alcohol. In particular instances, the solid ion conductive layer can include a foamed matrix resulted from a foaming system including a polymer including silicone, a cross-linking agent, a catalyst, and a foaming agent.

In a particular embodiment, the solid ion conductive layer can include a particular content of the polymer including siloxane that can facilitate improved formation and performance of the ion conductive layer. For example, the ion conductive layer can include at least 1 wt. % of the polymer including siloxane for a total weight of the ion conductive layer, such as at least 2 wt. %, at least 5 wt. %, at least 7 wt. %, at least 9 wt. %, at least 12 wt. %, at least 15 wt. %, at least 20 wt. %, at least 25 wt. %, at least 30 wt. %, or at least 35 wt. % for a total weight of the ion conductive layer. In another example, the ion conductive layer may include at most 70 wt. % of the polymer including siloxane for the total weight of the ion conductive layer, such as at most 60 wt. %, at most 55 wt. %, at most 50 wt. %, at most 48 wt. %, at most 45 wt. %, at most 40 wt. %, at most 35 wt. %, at most 28 wt. %, at most 25 wt. %, at most 20 wt. %, at most 15 wt. %, at most 12 wt. %, or at most 10 wt. % for the total weight of the ion conductive layer. Moreover, the content of the polymer including siloxane may be in a range including any of the minimum and maximum percentages noted herein.

In more particular instances, the solid ion conductive layer may include a particular content of the catalyst, such as Pt, of at least 10 ppm, at least 20 ppm, at least 30 ppm, or at least 50 ppm for the total weight of the foamed matrix. In more particular instances, greater than 50 ppm or greater than 100 ppm for the total weight of the foamed matrix, such as at least 150 ppm, at least 200 ppm, at least 250 ppm, at least 300 ppm, at least 350 ppm, at least 400 ppm, at least 500 ppm, or at least 600 ppm for the total weight of the foamed matrix. Alternatively or additionally, the solid ion conductive layer may include a particular content of catalyst, such as Pt, of at most 1 wt. % for the total weight of the solid ion conductive layer, such as at most 0.9 wt. %, at most 0.7 wt. %, at most 0.6 wt. %, at most 0.5 wt. %, at most 0.4 wt. %, at most 0.3 wt. %, at most 0.2 wt. %, at most 0.1 wt. %, at most 900 ppm, at most 800 ppm, at most 700 ppm, at most 600 ppm, at most 500 ppm, or at most 400 ppm for the total weight of the foamed matrix. Moreover, the solid ion conductive layer may include a content of catalyst, such as Pt, in a range including any of the minimum and maximum values noted herein.

In a particular aspect, the solid ion conductive layer can include polyvinyl chloride. More particularly, the foamed matrix may be a reaction product of a foaming system including polyvinyl chloride, a plasticizer, and a blowing agent. In particular implementations, the plasticizer can include diisononyl phthalate (DINP), and the blowing agent can include azodicarbonamide.

In a particular aspect, the solid ion conductive layer can include polyurethane that can be a reaction product of a foaming system including a hydrophobic polyol, a crosslinking agent having an HBL value of at most 4, and a foaming agent. An example of the crosslinking agent can include isocyanate 370, hexamethylene diisocyanate (HDI), isophorone diisocyanate, hydrophobic polyisocyanates, methylene diphenyl diisocyanate or any combination thereof. An example of the foaming agent can include cyclopentane, pentane, isopentane, or any combination thereof. An example of hydrophobic polyol can include hydrophobic polyol under the commercial designation of VORAPEL™ D3201 and VORAPEL™ T5001 from Dow and SOVERMOL® 750 and SOVERMOL® 818 from BASF.

In a particular embodiment, the solid ion conductive layer can include a particular content of polyurethane that can facilitate improved formation and performance of the ion conductive layer. For example, the ion conductive layer can include at least 1 vol % of polyurethane for a total volume of the ion conductive layer, such as at least 2 vol %, at least 5 vol %, at least 7 vol %, at least 10 vol %, at least 15 vol %, at least 20 vol %, at least 25 vol %, at least 28 vol %, at least 30 vol %, or at least 35 vol %. In another example, the ion conductive layer may include at most 30 vol % of polyurethane for the total volume of the ion conductive layer, such as at most 50 vol %, at most 48 vol %, at most 45 vol %, at most 42 vol %, at most 40 vol %, at most 38% vol %, or at most 35 vol % for the total volume of the ion conductive layer. Moreover, the content of the polyurethane may be in a range including any of the minimum and maximum percentages noted herein. For example, the ion conductive layer can include at least 5 vol % and at most 45 vol % of polyurethane for a total volume of the ion conductive layer.

In a particular aspect, the foamed matrix can include a particular ratio of $V_E:V_{PU}$, wherein $V_{PU}$ is a volume percent of polyurethane relative to the total volume of the foamed matrix, and $V_E$ is a volume percent of the electrolyte material relative to the total volume of the foamed matrix. In an example, the ratio of $V_E:V_{PU}$ can be at least 1.2, such as at least 1.5, at least 2, at least 2.2, at least 2.5, at least 2.7, at least 3, at least 3.3, or at least 3.5. In another instance, the ratio of $V_E:V_{PU}$ can be at most 15, at most 12, at most 10, at most 9.5, at most 9, at most 8.5, at most 8, at most 7.5, at most 7, at most 6.5, at most 6, at most 5.5, at most 5, at most 4.5, or at most 4, at most 3.5, at most 3, at most 2.5, or at most 2. For example, the ratio of $V_E:V_{PU}$ can be at least 2.5 and at most 12. In a further example, the ratio of $V_E:V_{PU}$ can be in a range including any of the minimum and maximum values noted herein.

In another aspect, the solid ion conductive layer can include a polymer including epoxy. In a particular aspect, the polymer can include epoxy formed from a foaming reaction of hydrophobic epoxy resin and a cross-linking agent. An example of epoxy resin can include tris hydroxyl phenyl ethane, resorcinol diglycidyl ether, hydrogenated bisphenol-A diglycidyl ether, modified bisphenol-A diglycidyl ether, phenol novolac epoxy, or any combination thereof. In another example, epoxy under the commercial designation of Der™ 331 may be used. In another example, Araldite® casting system CY 221 from Vantico can be used. An example of the cross-linking agent can include amine or thiol. A particular example of the hardener can be Ancamine®1922A, Capcure® 3-800, or Gabepro® 800. An exemplary foaming agent can include pentane.

In a particular embodiment, the solid ion conductive layer can include a particular content of epoxy that can facilitate improved formation and performance of the ion conductive layer. For example, the ion conductive layer can include at least 1 vol % of epoxy for a total volume of the ion conductive layer, such as at least 2 vol %, at least 3 vol %, at least 4 vol %, at least 5 vol %, at least 7 vol %, at least 10 vol % at least 15 vol %, at least 20 vol %, at least 25 vol %, at least 30 vol %, or at least 35 vol %. In another example, the ion conductive layer may include at most 50 vol % of epoxy for the total volume of the ion conductive layer, such as at most 48 vol %, at most 45 vol %, at most 40 vol %, at most 35 vol %, at most at most 28 vol %, at most 25 vol %, at most 20% vol %, at most 15 vol %, at most 12 vol %, at most 10 vol %, at most 8 vol %, or at most 5 vol % for the total volume of the ion conductive layer. Moreover, the content of the epoxy may be in a range including any of the minimum and maximum percentages noted herein. For example, the ion conductive layer can include at least 5 vol % and at most 45 vol % of epoxy for a total volume of the ion conductive layer.

In a particular aspect, the foamed matrix can include a particular ratio of $V_E:V_{EP}$, wherein $V_{EP}$ is a volume percent of epoxy relative to the total volume of the foamed matrix, and $V_E$ is a volume percent of the electrolyte material relative to the total volume of the foamed matrix. In an example, the ratio of $V_E:V_{EP}$ can be at least 1.2, such as at least 1.5, at least 2, at least 2.2, at least 2.5, at least 2.7, at least 3, at least 3.3, or at least 3.5. In another instance, the ratio of $V_E:V_{EP}$ can be at most 15, at most 12, at most 10, at most 9.5, at most 9, at most 8.5, at most 8, at most 7.5, at most 7, at most 6.5, at most 6, at most 5.5., at most 5, at most 4.5, or at most 4. In a further example, the ratio of $V_E:V_{EP}$ can be in a range including any of the minimum and maximum values noted herein. For example, $V_E:V_{EP}$ can be at least 2.5 and at most 12.

In an aspect, the organic material may be contained in the foamed matrix. In a further aspect, the electrolyte material can be dispersed in the organic material.

In an embodiment, the ion conductive layer can include a lithium salt dispersed in the organic material. The lithium salt may facilitate improved ion conductivity of the ion conductive layer. An example of the lithium salt can include, but not limited to, $LiPF_6$, $LiClO_4$, $LiBF_4$, $LiAsF_6$, LiTf, LiSA, LiFSI, LiTFSI, LiBETI, LiCTFSI, LiBOB, LiTDI, LiPDI, LiDCTA, $LiB(CN)_4$, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ or a combination thereof.

In an embodiment, the ion conductive layer can include one or more pore characteristics including, but not limited to, a particular average pore size, a particular pore size distribution, such as $D_{10}$, $D_{50}$, and/or $D_{90}$, a particular pore shape, a particular length, a particular width, a particular average aspect ratio, a particular pore distribution, a particular porosity, a particular open porosity, a particular closed porosity, or any combination thereof. The one or more particular pore characteristics in combination with one or more other features of the ion conductive layer are expected to improve the formation and performance of the ion conductive layer.

In an embodiment, the solid ion conductive layer can include a plurality of pores including closed pores, open pores, such as interconnected pores, or any combination thereof. In another embodiment, the solid ion conductive layer can include a particular total porosity that can facilitate improved formation and performance of the solid ion conductive layer. In an aspect, the solid ion conductive layer can include a total porosity of at least 20 vol %, such as at least 30 vol %, at least 40 vol %, at least 50 vol %, at least 60 vol % at least 70 vol % or at least 80 vol % for a total volume of the solid ion conductive layer. In another aspect, the solid ion conductive layer can include a total porosity of at most 95 vol %, such as at most 90 vol %, at most 85 vol %, at most 80 vol %, at most 75 vol %, at most 70 vol %, at most 65%, at most 60%, at most 55%, or at most 50%. Moreover, the solid ion conductive layer can include a total porosity in a range including any of the minimum and maximum percentages noted herein.

In a further embodiment, the solid ion conductive layer can include a particular average pore size that can facilitate improved performance of the solid ion conductive layer. For instance, average pore size can be at most 50 microns, at most 45 microns, at most 40 microns, at most 35 microns, at most 30 microns, at most 25 microns, at most 20 microns, at most 17.5 microns, at most 15 microns, at most 12.5 microns, at most 10 microns at most 7.5 microns, or at most 5 microns. In another instance, the average pore size can be at least 0.1 microns, at least 0.3 microns, at least 0.5 microns, at least 0.7 microns, at least 1 micron, at least 1.5 microns, at least 2 microns, at least 2.5 microns, at least 3 microns, at least 5 microns, at least 7.5 microns, at least 10 microns, at least 12.5 microns, porosity of at least 15 microns, at least 17.5 microns, at least 20 microns. In a further instance, the average pore size can include any of the minima and maxima values noted herein.

In another embodiment, the solid ion conductive layer can include at least 50% of the pores having pore sizes within ±30% of the average pore size, or within ±25%, or within ±20%, or within ±15%, or within ±10%, or within ±5% of the average pore size. In another instance, at least 60% of the pores having pore sizes within ±30% of the average pore size, or within ±25%, or within ±20%, or within ±15%, or within ±10%, or within ±5% of the average pore size. In a further instance, at least 70%, such as at least 80%, or at least 90% of the pores having pore sizes within ±30% of the average pore size, or within ±25%, or within ±20%, or within ±15%, or within ±10%, or within ±5% of the average pore size.

In a further embodiment, the solid ion conductive layer can include a particular porosity that can include open pores. In an aspect, at least 5% of a total porosity can be open, at least 10%, at least 20%, at least 30%, at least 40%, at least 50%, at least 60%, at least 70%, at least 80%, or at least 90% of the total porosity are open. For example, the majority of the pores can include open porosity. For instance, at least 60% of the total porosity can include open pores, such as at least 70%, at least 80%, or at least 90% of the total porosity can include open pores. In a particular instance, 95% of the porosity or essentially all of the pores can be open pores. In another aspect, at most 95% of a total porosity can be open, at most 90%, at most 85%, at most 80%, at most 75%, at most 70%, at most 65%, at most 50%, at most 45%, at most 40%, at most 35%, at most 30%, at most 25%, at most 20%, at most 15%, at most 10%, or at most 5% of the total porosity can be open. Moreover, the solid ion conductive layer can include open pores in a range including any of the minimum and maximum percentages noted herein. For example, open pores can make up at least 50% to at most 95% of the total porosity of the solid ion conductive layer. In another example, the foamed matrix can include similar content of open pores to the solid ion conductive layer. In a particular example, the foamed matrix can consist essentially of open pores.

In an embodiment, the ion conductive layer may include closed pores. In an aspect, at least 0.5% of a total porosity can include closed pores. For example, at least 0.5%, at least 1%, at least 3%, at least 4%, or at least 5% of the total porosity can be closed. In another example, at most 10%, at most 8%, at most 6%, at most 4%, at most 3%, at most 2%, or at most 1% of the total porosity can include closed pores. Moreover, the solid ion conductive layer can include closed pores in a range including any of the minimum and maximum percentages noted herein. For example, closed pores can make up at least 0.5% to 10% of the total porosity of the solid ion conductive layer. In another example, the foamed matrix can include similar content of closed pores to the solid ion conductive layer. In a particular example, the foamed matrix can be essentially free of closed pores. In a more particular example, the solid ion conductive layer can consist of the foamed matrix.

In an embodiment, the solid ion conductive layer can include a first type of porosity and a second type of porosity, wherein the first and second types of porosity can include a different pore characteristic including average pore size, pore size distribution, pore orientation, a content of pores, or a combination thereof.

In an aspect, the first type of porosity can include a first average pore size and the second type of porosity can include a second average pore size, wherein the first average pore size can be greater than the second average pore size. In another aspect, the first type of porosity can include a first average pore size of at least 2 microns, at least 3 microns, at least 5 microns, at least 7 microns, at least 10 microns, at least 12 microns, at least 15 microns, or at least 17 microns. In a further aspect, the first type of porosity can include a first average pore size of at most 50 microns, at most 45 microns, at most 40 microns, at most 35 microns, at most 30 microns, at most 25 microns, at most 20 microns, at most 17 microns, at most 15 microns, at most 12 microns, at most 10 microns at most 7 microns, or at most 5 microns. Moreover, the first average pore size can be in a range including any of the minimum and maximum values noted herein. For example, the first type of pores can have an average pore size of 3 microns to 10 microns.

In a further aspect, the first type of porosity can include open porosity, closed porosity, or a combination thereof. In another aspect, the first type of porosity can include open pores. For example, the first porosity can make up at least 60%, at least 80%, or at least 90% of open pores of the solid ion conductive layer. In a particular aspect, the first type of porosity can consist essentially of open pores.

In an embodiment, the solid ion conductive layer can include a particular content of the first type of porosity that can facilitate improved formation and function of the solid ion conductive layer In an aspect, the first type of porosity can make up at least 1 vol % for the total volume of the ion conductive layer, at least 5 vol %, at least 10 vol %, at least 15 vol %, at least 20 vol %, at least 25 vol %, at least 30 vol %, at least 40 vol %, at least 50 vol %, at least 55 vol %, at least 60 vol %, at least 70 vol %, at least 80 vol %, or at least 90 vol % for the total volume of the ion conductive layer. In a further aspect, the first type of porosity can make up at most 95 vol % for the total volume of the ion conductive layer, at most 90 vol %, at most 80 vol %, at most 70 vol %, at most 60 vol %, at most 50 vol %, at most 40 vol %, at most 30 vol %, at most 20 vol %, or at most 10 vol % for the total volume of the ion conductive layer. In a particular aspect, the solid ion conductive layer can include a content of the first type of porosity in a range including any of the minimum and maximum percentages noted herein. For example, the first type of pores can make up 50 vol % to 80 vol % for the total volume of the ion conductive layer.

In a particular aspect, the first type of porosity can make up at least 50% of the total porosity, such as at least 60%, at least 70%, at least 80%, or at least 90% of the total porosity of the solid ion conductive layer. In another aspect, the first type of porosity may make up at most 95% of the total porosity, such as at most 90%, at most 80%, or at most 70% of the total porosity of the solid ion conductive layer. In yet another aspect, the total porosity can include the first porosity in a range including any of the minimum and maximum percentages noted herein. In a more particular aspect, the first porosity can make up the entire total porosity.

In an aspect, at least 50% of pores of the first type of porosity having pore sizes within ±30% of the first average pore size, or within ±25%, or within ±20%, or within ±15%, or within ±10%, or within ±5% of the first average pore size. In another instance, at least 60% of pores of the first type of porosity having pore sizes within ±30% of the first average pore size, or within ±25%, or within ±20%, or within ±15%, or within ±10%, or within ±5% of the first average pore size. In a further instance, at least 70%, such as at least 80%, or at least 90% of pores of the first type of porosity can have pore sizes within ±30% of the first average pore size, or within ±25%, or within ±20%, or within ±15%, or within ±10%, or within ±5% of the first average pore size. Pore size distribution can be determined based on at least 100 pores randomly selected from one or more scanning electron microscope images of one or more cross-sections of the ion conductive layer using Image J 1.52a, released on Apr. 23, 2018, or a version having a similar function.

In an aspect, the first types of porosity independently comprise an aspect ratio of length:width of at least 1, at least 1.2, at least 1.5, at least 2, at least 2.3, at least 2.5, at least 2.8, or at least 3. In another aspect, the first type of porosity can include an average aspect ratio of at most 30, at most 25, at most 22, at most 20, at most 15, at most 12, at most 10, at most 8, at most 5, or at most 4. In a further aspect, the average aspect ratio of the first type of porosity can be in a range including any of the minimum and maximum values noted herein. In a further aspect, at least 50%, at least 60%, at least 70%, at least 80%, or at least 90% of pores of the first type of porosity can include an aspect ratio of length:width of at least 1 and at most 3.

In a further aspect, the first type of porosity can include pores having spherical shapes. In another aspect, the first type of porosity can include pores that are horizontally oriented. As described herein, horizontally oriented is intended to describe pores having the longitudinal axis in which the length of the pore extends, extending along the plane defined by x-axis and y-axis, where the tape/film thickness is along the z-axis. In particular instances, the first porosity can consist essentially of horizontally oriented pores.

In a particular embodiment, the first type of porosity may consist essentially of pores formed by a foaming reaction. The foaming reaction will be described in detail later in this disclosure.

In an aspect, the solid ion conductive layer can include a particular content of the second type of porosity that can facilitate improved formation and function of the solid ion conductive layer. In an example, the solid ion conductive layer can include at most 50 vol % of the second type of porosity for the total volume of the solid ion conductive layer, such as at most 48 vol %, at most 45 vol %, at most 40 vol %, at most 37 vol %, at most 35 vol %, at most 30 vol %, at most 28 vol %, at most 25 vol %, at most 20 vol %, at most 18 vol %, at most 15 vol %, at most 12 vol %, at most 10 vol %, at most 8 vol %, or at most 5 vol %. In another example, the solid ion conductive layer can include at least 0.5 vol % of the second type of porosity for the total volume of the solid ion conductive layer, such as at least 1 vol %, at least 2 vol %, at least 3 vol %, at least 4 vol %, at least 5 vol %, at least 8 vol %, at least 10 vol %, at least 12 vol %, at least 15 vol %, at least 17 vol %, or at least 20 vol % for the total volume of the solid ion conductive layer. In a further example, the solid ion conductive layer can include a content of the second type of porosity in a range including any of the minimum and maximum values noted herein. For example, the solid ion conductive layer can include at least 1 vol % and at most 10 vol % of the second type of porosity for the total volume of the solid ion conductive layer. In a particular aspect, the solid ion conductive layer can be essentially free of the second type of porosity.

In a further aspect, the second type of porosity can include open pores, closed pores, or a combination thereof. In a particular aspect, the majority of pores of the second type of porosity can be open, and in a more particular aspect, the second type of porosity can consist essentially of open porosity.

In an embodiment, the solid ion conductive layer can include the second type of pores having a particular second average pore size that can facilitate improved formation and performance of the solid ion conductive layer. In an aspect, the second average pore size can be at most 1 micron, at most 0.8 microns, or at most 0.5 microns. In another aspect, the second average pore size can be at least 0.1 microns, at least 0.2 microns, at least 0.3 microns, or at least 0.5 microns. In a particular aspect, the second average pore size can be in a range including any of the minimum and maximum values noted herein. For example, the second average pore size can be at least 0.3 microns and at most 1 micron.

In an aspect, the second types of porosity can include an average aspect ratio of length:width of at least 1, at least 1.2, at least 1.5, at least 2, at least 2.3, at least 2.5, at least 2.8, or at least 3. In another aspect, the second types of porosity can include an average aspect ratio can be at most 30, at most 25, at most 22, at most 20, at most 15, at most 12, at most 10, at most 8, at most 5, or at most 4. In a further aspect, the second types of porosity can include an average aspect ratio in a range including any of the minimum and maximum values noted herein. For example, the second types of pre can have an average aspect ratio of at least 1 at most 5.

In a further aspect, the second type of porosity can include spherical pores, irregularly shaped pores, hexahedron pores, elongated pores, tortuous pores, acicular pores, needle-shaped pores, pores having a 3-dimensional structure, or any combination thereof. In a particular embodiment, the second type of porosity may include pores created by the controlled removal of an organic material as described in embodiments herein. In more particular instances, the second type of porosity may consist essentially of pores created by the controlled removal of an organic material.

Referring to FIG. 1, a cross-sectional view of an exemplary ion conductive layer 100 is illustrated, including the foamed matrix 101 including the matrix portion 110 including the material and organic material. The foamed matrix 101 further includes the first type of porosity including pores 102 and the second type of porosity including pores 104. The pores 102 are substantially spherical. The pores 102 include spherical pores and pores having other shapes. In a particular instance, the ion conductive layer 100 can be essentially free of the second type of porosity. As illustrated, the solid ion conductive layer 101 can include a thickness t extending in the directions of the z-axis.

Figure 2:
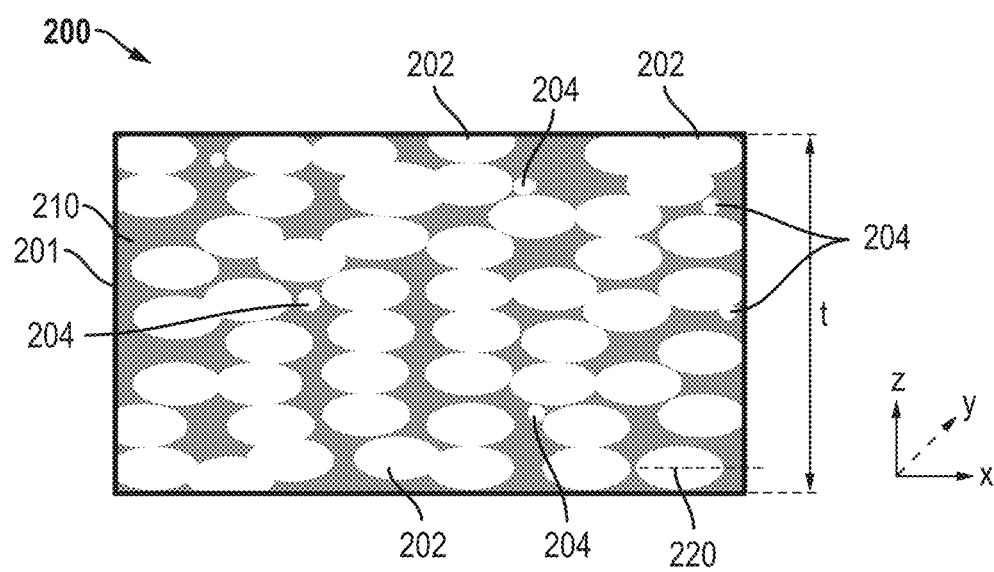
FIG. 2 includes a cross-sectional illustration of an ion conductive layer in accordance with another embodiment herein.

Referring to FIG. 2, an exemplary ion conductive layer 200 can include the foamed matrix 201 including the matrix portion 210 including the electrolyte material and the organic material. The foamed matrix 201 further includes the first type of porosity including pores 202 and the second type of porosity including pores 204. As illustrated, the pores 202 are elongated in the horizontal direction that is perpendicular to the thickness t of the ion conductive layer. The pores 202 can have a longitudinal axis 220 extending along the plane defined by the x-axis and y-axis. The orientation of the pores 202 can be the extending direction of the longitudinal axis 220. As illustrated, the pores 202 are horizontally oriented. The pores 202 include spherical pores and pores having other shapes. In a particular instance, the ion conductive layer 200 can be essentially free of the second type of porosity.

In an embodiment, the solid ion conductive layer can include a foamed matrix consisting of the electrolyte material and the organic material. In a particular instance, the foamed matrix can consist of the electrolyte material and a polymer including polyurethane, epoxy, or a combination thereof.

In an embodiment, the solid ion conductive layer can have a particular thickness that can facilitate improved formation and performance of the solid ion conductive layer. Any of the solid ion conductive layers noted in embodiments herein can include a thickness, such as the thickness t illustrated in FIGS. 1 to 2. In an aspect, the thickness t can be at most 1 mm, at most 800 microns, at most 600 microns, at most 500 microns, at most 400 microns, at most 300 microns, at most 200 microns, or at most 100 microns. In another instance, the thickness t can be at least 5 microns, at least 10 microns, at least 15 microns, at least 20 microns, at least 30 microns, or at least 40 microns. It is to be appreciated the solid ion conductive layer can have a thickness t in a range including any of the minimum and maximum values noted therein. For example, the thickness t can be in the range of 20 microns to 300 microns.

In an embodiment, the solid ion conductive layer may be a composite layer including the electrolyte material and an electron conductive material. The electron conductive material can include an active electrode material. In a further example, the electron conductive material can include graphite, carbon fibers, carbon particles, carbon nano-tubes, or a combination thereof. In a particular instance, the ion conductive layer can have a coating including an electron conductive material, such as a metallic coating. In a further embodiment, an anode can include the solid ion conductive layer and an active anode material disposed on the solid ion conductive layer.

In an embodiment, the solid ion conductive layer can include a particular ion conductivity that can facilitate improved performance of the ion conductive layer. In an aspect, a solid ion conductive layer can have an ion conductivity that is suitable for a solid-state battery, such as a solid-state lithium-ion battery.

Figure 3:
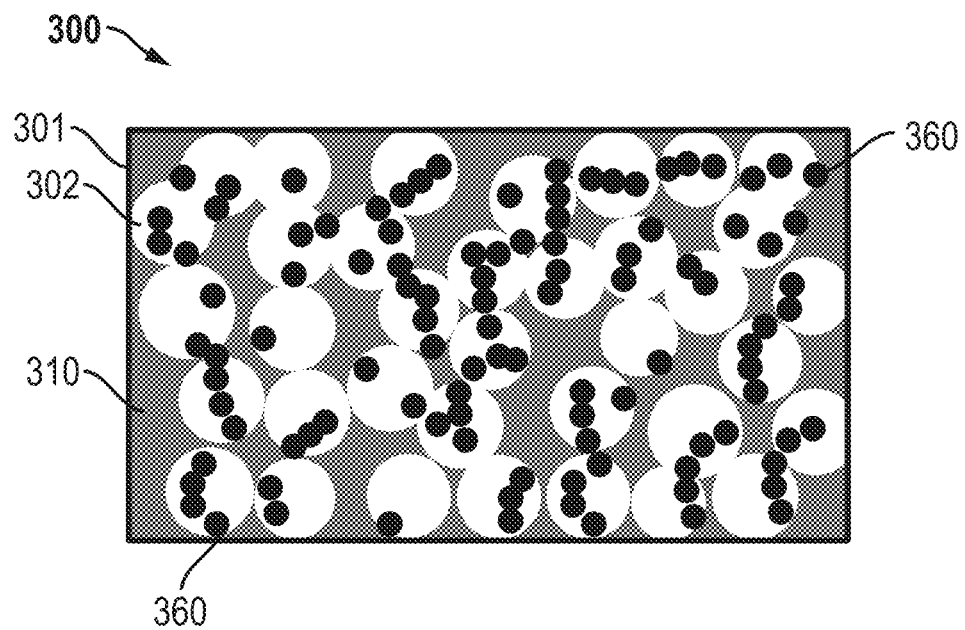
FIG. 3 includes a cross-sectional illustration of an ion conductive layer in accordance with another embodiment herein.

Referring to FIG. 3, a cross-sectional view of a solid ion conductive layer 300 is illustrated including the foamed matrix 301 including pores 302. As illustrated, in particular instances, the ion conductive layer 300 can be a composite layer, such as a mixed ion and electron conductive layer. For example, the solid ion conductive layer 300 can include an electron conductive material 360 dispersed in the foamed matrix 301. As illustrated, the electron conductive material 360 can be disposed in the pores 302. The electron conductive material can include an active electrode material, an electron conductive additive, or a combination thereof. In an embodiment, the solid ion conductive layer 300 can include an active anode material 360 disposed in the foamed matrix 301. In particular instances, the active anode material can include lithium metal, lithium titanate, or graphite. The foamed matrix 301 can include the matrix portion including the electrolyte material and organic material (not illustrated). In embodiments, the pores 302 can be the first type of porosity. The second type of porosity is not illustrated. In another embodiment, the solid ion conductive layer can consist essentially of the first type of porosity and the electrolyte material.

In a particular embodiment, an anode can include the solid ion conductive layer 300 illustrated in FIG. 3. In another embodiment, an anode can include the solid ion conductive layer 100 or 200 illustrated in FIGS. 1 and 2, respectively. In a particular instance, the anode can be 3 dimensionally structured. Notably, the solid ion conductive layer described in embodiments herein can facilitate improved formation and performance of an anode. For example, the anode as described in embodiments herein can have a specific weight energy density of at least 650 mAh/g, at least 700 mAh/g, at least 750 mAh/g, at least 800 mAh/g, at least 850 mAh/g, or at least 900 mAh/g, when the anode is fully charged with Li metal.

In another embodiment, the solid ion conductive layer can facilitate the improved formation and performance of a solid-state battery. In an aspect, a solid-state battery can include the solid ion conductive layer, such as the layer 100 illustrated in FIG. 1, 200 illustrated in FIG. 2, or 300 illustrated in FIG. 3. In a particular aspect, the solid-state battery can be a solid-state lithium-ion battery. In another particular instance aspect, a solid-state battery can include an anode including the composite layer 300 illustrated in FIG. 3.

In a further aspect, the solid-state battery can have an energy density of at least 700 Wh/L, at least 750 Wh/L, at least 800 Wh/L, or at least 850 Wh/L. In another aspect, the solid-state battery can have an energy density of at least 250 Wh/kg, at least 300 Wh/kg, at least 350 Wh/kg, or at least 400 Wh/kg.

Energy density can be tested on coin cell tests by controlling the electrolyte/binder solid loading (g) on the anode, and then electrochemically measuring the charge/discharge capacity. When all the Li-ion is placed at the cathode at the initial state, Li metal weight at the anode after charging can be calculated from the charged capacity (mAh), utilizing Li metal electrochemical capacity of 3860 mAh/g.

In another embodiment, the ion conductive layer can include an active cathode material. For example, the active electrode material 360 is illustrated in FIG. 3 can include an active cathode material. Exemplary active cathode materials can include lithium-containing oxide, transition metal fluorides, polyanion materials, fluorinated polyanion materials, transition metal sulfides, transition metal oxyfluorides, transition metal oxysulfides, transition metal oxynitrides, or any combination thereof. Particular exemplary cathode material may include $LiCoO_2$, $LiFePO_4$, $Li(NiCoAl)O_2$, $LiMnPO_4$, $LiMn_2O_4$, $LiNi_{1/3}Co_{1/3}Mn_{1/3}O_2$, or any combination thereof.

Figure 4:
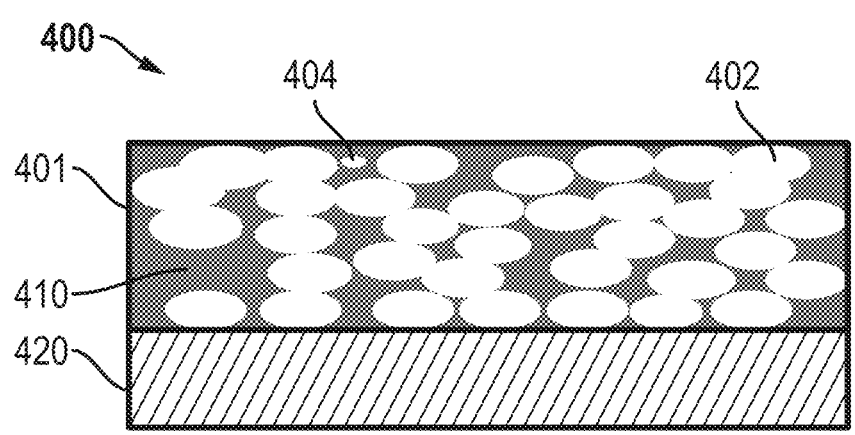
FIG. 4 includes a cross-sectional illustration of multi-layer structure in accordance with another embodiment herein.

FIG. 4 includes an illustration of a multi-layer structure 400. The multi-layer structure 400 can include a porous solid ion conductive layer 401 including pores 402 and 404 overlying another ion conductive layer 420. The ion conductive layer 420 may be dense. For example, the ion conductive layer 420 can have a porosity of at most 5 vol % for the total volume of the ion conductive layer 420. The solid ion conductive layer 401 can be similar to the ion conductive layer 100 illustrated in FIG. 1 or 200 illustrated in FIG. 2 or include any features described in embodiments herein. For example, the ion conductive layer 401 can include a foamed matrix 410 including the first type of porosity including pores 402 and the second type of porosity including pores 404. In an embodiment, the multilayer structure may form a portion of a solid-state battery. In an exemplary application, the dense ion conductive layer 420 may be an electrolyte and the porous ion conductive layer 401 may be a scaffold or a backbone structure for an electrode layer.

Figure 5:
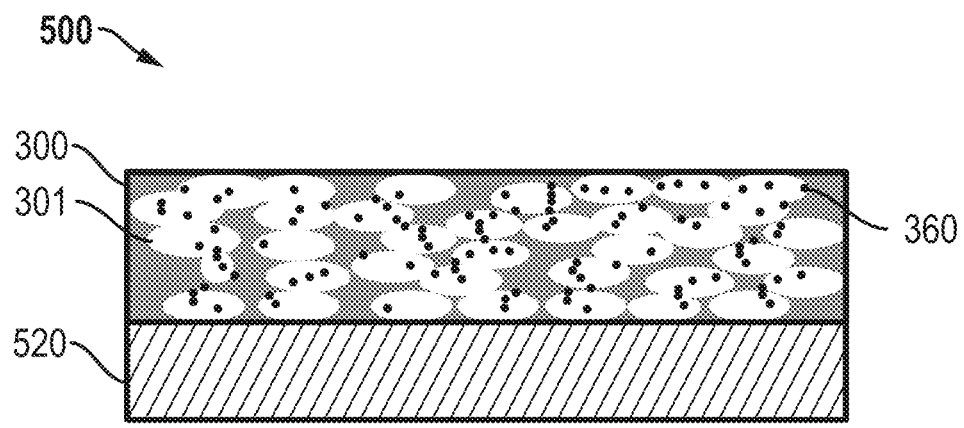
FIG. 5 includes a cross-sectional illustration of multi-layer structure in accordance with another embodiment herein.

FIG. 5 includes an illustration of a portion of a solid-state battery 500 including the ion conductive layer 300 illustrated in FIG. 3 overlying the layer 520. In particular instances, the layer 520 can be an electrolyte. In another particular instance, the ion conductive layer 300 can include an electron conductive material 360 disposed in the foamed matrix 301.

Figure 6:
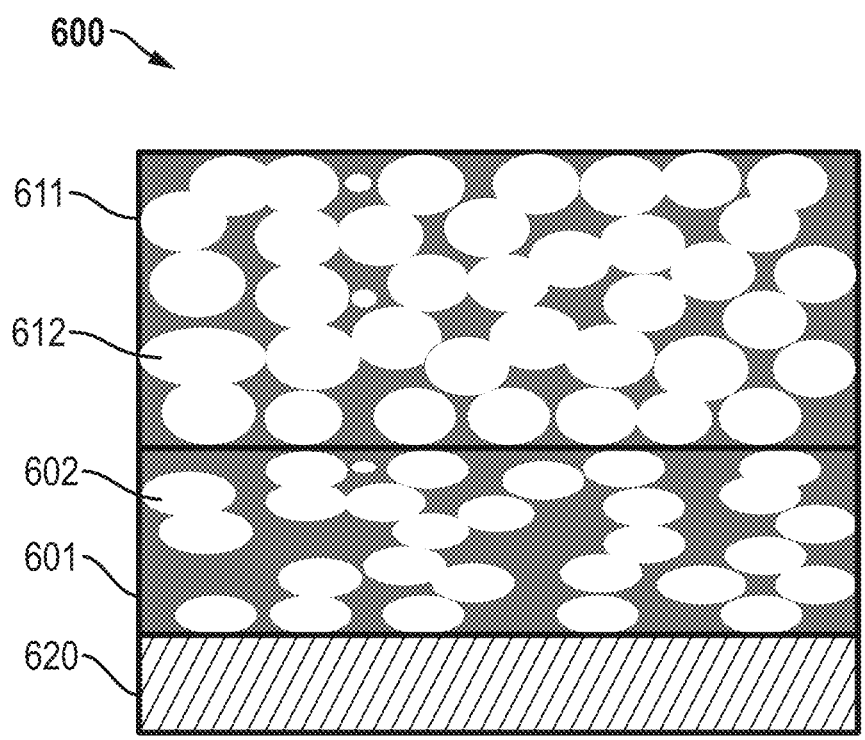
FIG. 6 includes a cross-sectional illustration of a multi-layer structure in accordance with an embodiment herein.

Referring to FIG. 6, a multi-layer structure 600 is illustrated. The multi-layer structure 600 can include an ion conductive layer 620 similar to 520 illustrated in FIG. 5 or 420 illustrated in FIG. 4. The porous solid ion conductive layers 601 and 610 can include pores 602 and 612 and be similar to any of the solid ion conductive layers 100, 200, or 401 as illustrated in FIGS. 1, 2, and 4, respectively. The porous solid ion conductive layers 601 and 610 can include any features described with respect to the solid ion conductive layer of embodiments herein. For example, each of the ion conductive layers 601 and 610 can include a foamed matrix including pores 602 and 612, respectively. In particular instances, the ion conductive layers 601 and 610 can include different pore characteristics from each other including porosity, average pore size, pore size standard deviation, pore orientation, aspect ratio, or a combination thereof. In more particular instances, pores 602 and 612 can form graded porosity that has a changing pore size, contents of pores, aspect ratio, pore orientation, or any combination thereof. For example, the average pore size, contents of pores, or a combination thereof can increase in the direction extending away from the ion conductive layer 620. In another example, as illustrated, pores 612 can have a greater average pore size than pores 602. In still another example, the ion conductive layer 611 can include a higher content of pores 612 compared to the content of pores 602 in the ion conductive layer 601. In another instance, the multi-layer structure 600 can have additional layers.

Figure 7:
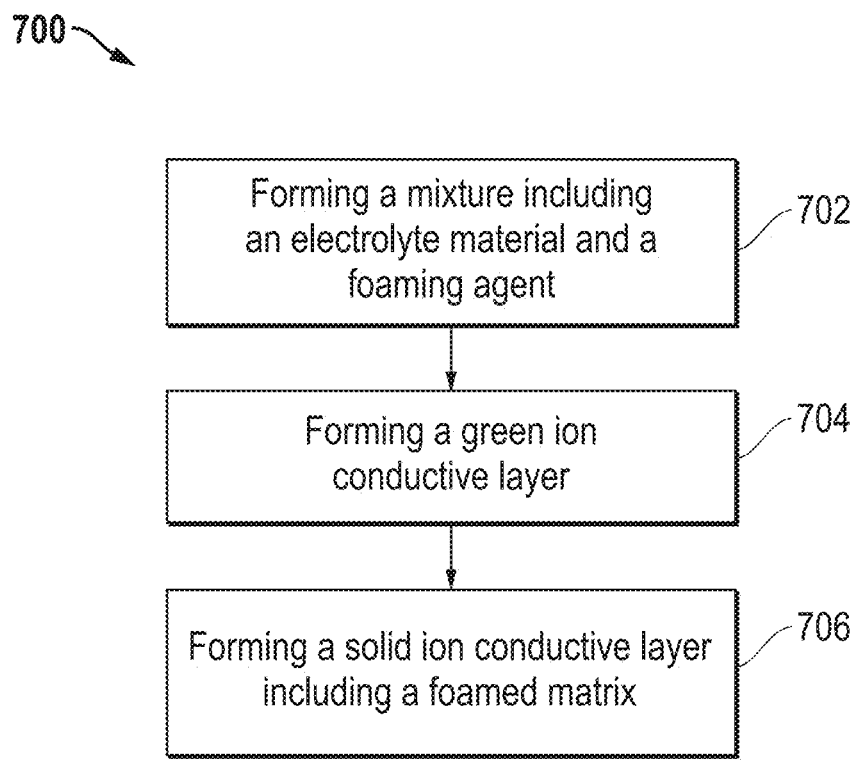
FIG. 7 includes an illustration of a process in accordance with an embodiment herein.

Referring to FIG. 7, an exemplary process 700 is illustrated. The process 700 can include forming a mixture at block 702 having a composition including an electrolyte material and a foaming agent, wherein the electrolyte material can include a hygroscopic material, such as a halide-based material, a sulfide-based material, or a combination thereof. The composition can further include an organic material precursor and a cross-linking agent. The composition can optionally include a binder material, a dispersant, plasticizer, and/or homogenizer. In some instances, the mixture may further include a lithium salt, an organic electrolyte material, and/or an electron conductive material, such as a cathode material or an anode material.

The ingredients may be added in any suitable order for forming a homogenous mixture, and a mixing aid, such as a mixer, may be used to facilitate mixing.

The ingredients of the composition may not be reactive to the hygroscopic material. For example, each of the organic material precursor, the cross-linking agent, the foaming agent, and the binder material can be hydrophobic. In another example, each of the organic material precursor, the cross-linking agent, the foaming agent, and the binder material can have an HLB value, Moisture Absorption Rate, Reactivity Value, or any combination thereof as noted in embodiments herein.

An exemplary organic material precursor can include a resin, a polymer, a prepolymer, a monomer, or a combination thereof. The organic material precursor can form into the organic material, such as a polymer. In the presence of the foaming agent and the cross-linking agent, the organic material precursor can also have a foaming reaction to form a foamed matrix. A particular example of the organic material precursor can include epoxy resin, polyol, or a combination thereof.

An example of the foaming system can include hydrophobic polyol, a crosslinking agent including isocyanate 370, hexamethylene diisocyanate (HDI), isophorone diisocyanate, hydrophobic polyisocyanates, or any combination thereof, and a foaming agent such as cyclopentane, pentane, isopentane, methylene diphenyl diisocyanate, or any combination thereof.

Another example of the foaming system can include epoxy resin, a cross-linking agent including amine or thiol, and the forming agent such as pentane.

In exemplary implementations, the composition can include at least 50 wt. % to at most 85 wt. % of the electrolyte material, at least 2 wt. % to at most 10 wt. % of the foaming agent, at least 5 wt. % to at most 20 wt. % of the organic material precursor, and at least 5 wt. % to at most 20 wt. % of the cross-linking agent for the total weight of the composition.

The composition can also include a solvent, and the mixture can be formed into a slurry or a colloidal suspension. The solvent may not be reactive to the hygroscopic material. For example, the solvent can have an HLB value, Moisture Absorption Rate, Reactivity Value, or any combination thereof as noted in embodiments herein. An exemplary solvent can include toluene, pentene, xylene, hexane, heptane, octane, nonane, decane, undecane, dodecane, cyclopentane, cyclohexane, cycloheptane, cyclooctane, cyclodecane, cycloundecane, cyclodocecane, isobutyl isobutyrate, dimethyl carbonate, dimethyl sulfide, or the like.

In particular implementations, one or more binders may be mixed in the slurry to facilitate improved formation and performance of the ion conductive layer. An exemplary binder can include one or more materials selected from the group consisting of paraffin wax, polyisobutylene, polyvinyl pyrrolidone, poly (methyl methacrylate), polyethylene glycol, camphene, urea, poly(acrylonitrile), polyethylene carbonate, polyvinyl chloride, poly(ethylene oxide), poly(propylene oxide), poly(vinylidene fluoride), poly(dimethylsiloxane), poly[bis(methoxy ethoxyethoxide)-phosphazene], polypropylene glycol, polycaprolactone, and poly(trimethylene carbonate), poly(methyl acrylate), poly (vinylidene fluoride)-co-hexafluoropropylene, poly(acrylonitrile-co-butadiene), poly(styrene-butadiene-styrene), and styrene-ethylene-butylene-styrene, hydrogenated nitrile butadiene rubber, high density polyethylene, low density polyethylene, poly(ethylene oxide), polystyrene, and polyurethane, or any combination thereof.

The process 700 can include forming a green layer at block 704. In an example, forming a green layer can include treating the mixture by casting, coating, printing, binder jetting, extrusion, compacting, calendaring, pressing, or any combination thereof. In particular instances, the green layer can be in the form of a tape or film. The green layer may include any thickness noted in embodiments herein. In particular implementations, forming a green ionic conductive layer can include tape casting, such as doctor blading or knife coating. Tape casting may be performed in a dry condition, for example in a dry room or a glove box. In another particular implementation, the green layer may be formed by extruding the mixture to form a film or a tape.

The process 700 can include forming the ion conductive layer including a foamed matrix and electrolyte material at block 706. In an embodiment, the process 700 can include performing a foaming reaction forming the foamed matrix including an organic material formed from the organic material precursor. In particular instances, foaming can be performed in the film or in the tape. In another instance, the process 700 can include simultaneously controlling the thickness of the film or tape and formation of porosity. In particular, foaming may be performed at the same time when the thickness of the green layer is constrained.

Figure 8A:
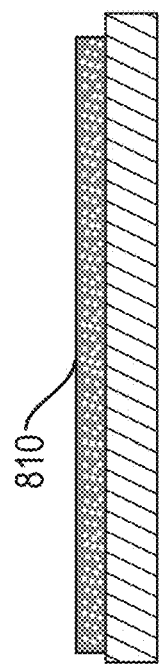
FIGS. 8A to 8D include illustrations of processes for forming green layers.
Figure 8B:
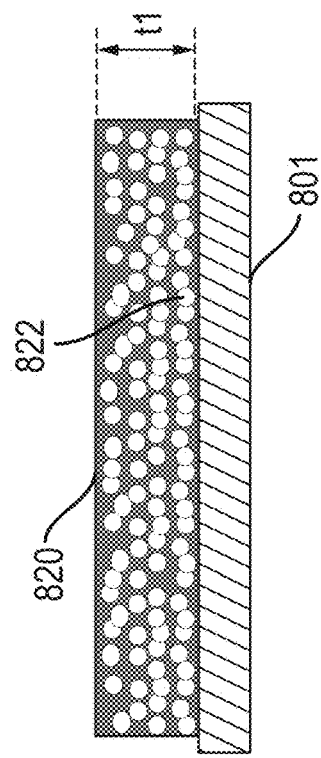
Figure 8C:
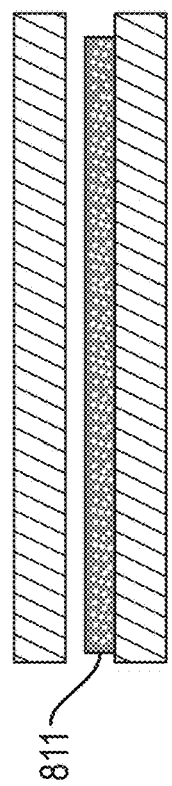
Figure 8D:
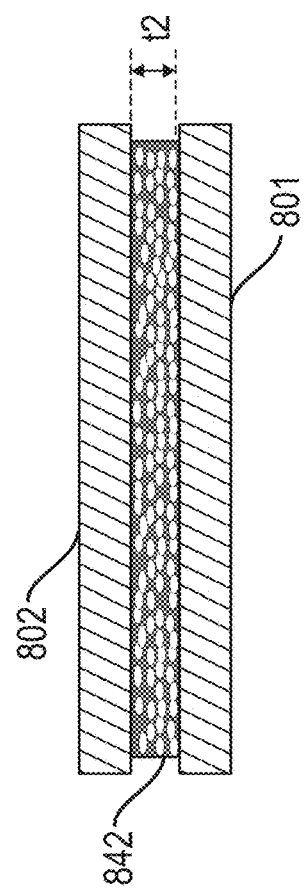

Referring to FIG. 8A to FIG. 8B, a green layer 810 is cast on a substrate 801, without constraint, a foamed layer 820 can have pores 822 and thickness t1. As illustrated in FIG. 8C and FIG. 8D, a similar green layer 830 can be formed into a foamed layer 840 having pores 842 and thickness t2 when the thickness of the green layer is constrained, such as with the aid of a fixture or a die 802. As illustrated, pores 842 can have a different orientation than pores 822. The thickness t2 can be smaller than t1.

In an exemplary implementation, the foaming reaction may be performed at a temperature of at least 20° C. to 100° C. In a further example, extrusion and foaming may be performed continuously. In another example, foaming can be performed at a temperature that is higher than the extrusion temperature. In a particular example, extrusion and foaming can be performed within a single die equipped with zoned temperatures and thickness control.

Figure 9:
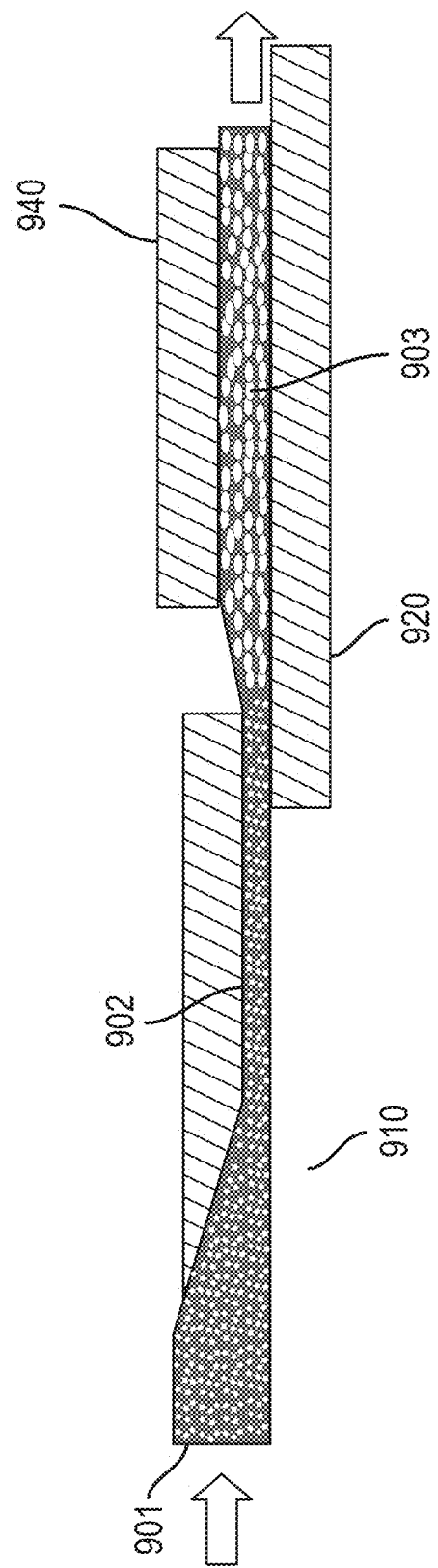
FIG. 9 includes an illustration of a process in accordance with another embodiment herein.

Referring to FIG. 9, an exemplary continuous process is illustrated. The mixture 901 can be extruded at zone 910 to form a green layer 902. The green layer 902 can be heated at zone 920 to perform a foaming reaction under thickness constraint to form a foamed green layer 903. The foamed green layer 903 can be subsequently cooled at zone 940. In particular instances, the process can be performed in a die.

In another embodiment, the process 700 can include forming a plurality of green layers. For instance, a first green layer may be formed, and a second green layer may be formed overlying the first green layer. The first green layer can include the mixture. The second green layer may include an electrolyte material that can be the same or different from the electrolyte material in the mixture of block 702. In an exemplary implementation, tape casting may be used to form each green layer. In particular implementations, the green layers may be formed separately and then laminated. Alternatively, tape casting may be performed to form the green layers simultaneously. In particular implementations, roll-to-roll deposition may be performed to cast a stack of green layers simultaneously. In another example, additional green layers may be formed overlying the first and/or the second green layer. In another example, the plural layers can be co-extruded to form the multi-layer structure.

In another instance, one or more green layers may be dried to form the finally formed one or more layers, such as the porous solid ion conductive layer, an electrolyte layer, or a multi-layer structure including a combination thereof. Drying may be performed at room temperature or with the application of heat. In a further instance, the mixture in the green layer can be cured at a temperature from 20° C. to 160° C. In a particular instance, the curing temperature may be higher than the foaming temperature. For example, epoxy resins may cure at a higher temperature than the foaming temperature. After reading the present disclosure, a skilled artisan appreciates that the crosslinking temperature (e.g., hardening temperature of epoxy) can be controlled by the selection of the organic material precursors (e.g., epoxides) and the crosslinking agents. In a further instance, a multi-layer structure can be formed including a first ion conductive layer overlying a second ion conductive layer.

In a particular implementation, heat may be applied to the first green layer to facilitate the removal of a binder material. In particular instances, heating the first green layer may include removing one or more binder material. In particular aspects, heating can include evaporating one or more binder material. Such binder material can include one or more material selected from the group consisting of paraffin wax, polyisobutylene, polyvinyl pyrrolidone, poly (methyl methacrylate), polyethylene glycol, camphene, urea, poly(acrylonitrile), polyethylene carbonate, polyvinyl chloride, poly (ethylene oxide), or a combination thereof. In particular instances, heating can include a heating temperature and/or a heating time that can facilitate the formation of the second type of porosity. An exemplary heating temperature can include the evaporation temperature of the binder material. In another instance, the heating temperature can include from 30° C. to 200° C. In a further instance, the heating time can be from 2 minutes to 120 minutes.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A solid ion conductive layer, comprising a foamed matrix including an electrolyte material including a hygroscopic material.

Embodiment 2. The solid ion conductive layer of embodiment 1, comprising a total porosity of at least 30 vol %, at least 40 vol %, at least 50 vol %, at least 60 vol % at least 70 vol %, or at least 80 vol % for a total volume of the solid ion conductive layer.

Embodiment 3. The solid ion conductive layer of embodiment 1 or 2, comprising a total porosity of at most 95 vol %, at most 90 vol %, at most 85 vol %, at most 80 vol %, at most 75 vol %, at most 70 vol %, at most 65%, at most 60%, at most 55%, or at most 50%.

Embodiment 4. The solid ion conductive layer of any one of embodiments 1 to 3, comprising a thickness of at most 1 mm, at most 800 microns, at most 600 microns, at most 500 microns, at most 400 microns, at most 300 microns, at most 200 microns, or at most 100 microns.

Embodiment 5. The solid ion conductive layer of any one of embodiments 1 to 4, comprising a thickness of at least 5 microns, at least 10 microns, at least 15 microns, at least 20 microns, at least 30 microns, or at least 40 microns.

Embodiment 6. The solid ion conductive layer of any one of embodiments 1 to 5, wherein the electrolyte material comprises a bulk ion conductivity of at least 0.1 mS/cm, at least 0.5 mS/cm, at least 1 mS/cm, at least 1.5 mS/cm, or at least 2 mS/cm.

Embodiment 7. The solid ion conductive layer of any one of embodiments 1 to 6, wherein the electrolyte material comprises a bulk ion conductivity of at most 50 mS/cm, at most 45 mS/cm, at most 40 mS/cm, at most 35 mS/cm, at most 30 mS/cm, at most 29 mS/cm, at most 25 mS/cm, at most 20 mS/cm, at most 15 mS/cm, at most 10 mS/cm, at most 5 mS/cm, at most 3 mS/cm, at most 2 mS/cm, or at most 1 mS/cm.

Embodiment 8. The solid ion conductive layer of any one of embodiments 1 to 7, comprising an organic material including a polymer, wherein the polymer is not reactive to the electrolyte material.

Embodiment 9. The solid ion conductive layer of any one of embodiments 1 to 8, comprising an organic material including a polymer, wherein the polymer has an HLB number of at most 5, at most 4.6, at most 4.2, at most 4, at most 3.5, at most 3, at most 2.5, at most 2, at most 1, at most 0.5, or at most 0.1.

Embodiment 10. The solid ion conductive layer of any one of embodiments 1 to 9, comprising an organic material including a polymer, wherein the polymer has a Moisture Absorption Rate of at most 1.0 wt. %, such as at most 0.8 wt. %, at most 0.5 wt. %, at most 0.3 wt. %, or at most 0.1 wt. %.

Embodiment 11. The solid ion conductive layer of any one of embodiments 1 to 10, comprising an organic material including a polymer, wherein the polymer has a Reactivity Value of at most 10%, such as at most 9%, at most 8%, at most 7%, at most 6%, at most 5%, at most 4%, at most 3%, or at most 2%.

Embodiment 12. The solid ion conductive layer of any one of embodiments 1 to 11, comprising an organic material including paraffin wax, polyisobutylene, polyvinyl pyrrolidone, poly (methyl methacrylate), polyethylene glycol, camphene, urea, poly(acrylonitrile), polyethylene carbonate, polyvinyl chloride, poly(ethylene oxide), or any combination thereof.

Embodiment 13. The solid ion conductive layer of any one of embodiments 1 to 12, comprising an organic material selected from the group consisting of poly(propylene oxide), poly(vinylidene fluoride), poly(dimethylsiloxane), poly[bis (methoxy ethoxyethoxide)-phosphazene], polypropylene glycol, polycaprolactone, and poly(trimethylene carbonate), poly(methyl acrylate), poly(vinylidene fluoride)-co-hexafluoropropylene, poly(acrylonitrile-co-butadiene), poly (styrene-butadiene-styrene), and styrene-ethylene-butylene-styrene, hydrogenated nitrile butadiene rubber, high density polyethylene, low density polyethylene, poly(ethylene oxide), polystyrene, and polyurethane, or any combination thereof.

Embodiment 14. The solid ion conductive layer of any one of embodiments 1 to 13, comprising an organic material at a content of at most 50 vol % for a total volume of the solid ion conductive layer, at most 45 vol %, at most 40 vol %, at most 35 vol %, at most 30 vol %, at most 28 vol %, at most 25 vol %, at most 20 vol %, at most 15 vol %, at most 10 vol %, or at most 5 vol % for a total volume of the solid ion conductive layer.

Embodiment 15. The solid ion conductive layer of any one of embodiments 1 to 14, comprising the organic material at the content of at least 0.5 vol % for the total volume of the solid ion conductive layer, at least 1 vol %, at least 2 vol %, at least 3 vol %, at least 4 vol %, at least 5 vol %, at least 6 vol %, at least 7 vol %, at least 8 vol %, at least 9 vol %, at least 10 vol %, at least 12 vol %, or at least 15 vol % for the total volume of the solid ion conductive layer.

Embodiment 16. The solid ion conductive layer of any one of embodiments 1 to 15, wherein the foamed matrix comprises a ratio of $V_E:V_O$, wherein $V_O$ is a volume percent of the organic material relative to the total volume of the solid ion conductive layer, and $V_E$ is a volume percent of the electrolyte material relative to the total volume of the solid ion conductive layer, wherein the ratio is at least 0.5, at least 1, at least 1.5, at least 2, at least 2.5, or at least 3.

Embodiment 17. The solid ion conductive layer of embodiment 16, wherein the ratio is at most 10, at most 9, at most 8, at most 7, at most 6, at most 5, at most 4, or at most 3.

Embodiment 18. The solid ion conductive layer of any one of embodiments 1 to 17, comprising an organic material including a polymer including epoxy, polyurethane, poly (ethylene oxide), or a combination thereof.

Embodiment 19. The solid ion conductive layer of any one of embodiments 1 to 18, comprises at least 1 vol % of polyurethane for the total volume of the ion conductive layer, at least 2 vol %, at least 4 vol %, at least 5 vol %, at least 8 vol %, at least 10 vol %, at least 12 vol %, at least 15 vol %, at least 18 vol %, at least 20 vol %, at least 25 vol %, at least 30 vol %, or at least 35 vol % for a total volume of the ion conductive layer.

Embodiment 20. The solid ion conductive layer of any one of embodiments 1 to 19, comprises at most 50 vol % of polyurethane for the total volume of the ion conductive layer, at most 45 vol %, at most 42 vol %, at most 40 vol %, at most 38 vol %, or at most 35 vol % for a total volume of the ion conductive layer.

Embodiment 21. The solid ion conductive layer of any one of embodiments 1 to 20, comprising at least 1 vol % of epoxy for the total volume of the ion conductive layer, at least 2 vol %, at least 4 vol %, at least 5 vol %, at least 8 vol %, at least 10 vol %, at least 12 vol %, at least 15 vol %, at least 18 vol %, at least 20 vol %, at least 25 vol %, at least 30 vol %, or at least 35 vol % for a total volume of the ion conductive layer.

Embodiment 22. The solid ion conductive layer of any one of embodiments 1 to 21, comprising at most 50 vol % of epoxy for the total volume of the ion conductive layer, at most 45 vol %, at most 42 vol %, at most 40 vol %, at most 38 vol %, or at most 35 vol % for a total volume of the ion conductive layer.

Embodiment 23. The solid ion conductive layer of any one of embodiments 1 to 22, wherein the electrolyte material is embedded in the foamed matrix.

Embodiment 24. The solid ion conductive layer of any one of embodiments 1 to 23, further comprising a lithium salt dispersed in the foamed matrix, wherein the lithium salt comprises $LiPF_6$, $LiClO_4$, $LiBF_4$, $LiAsF_6$, LiTf, LiSA, LiFSI, LiTFSI, LiBETI, LiCTFSI, LiBOB, LiTDI, LiPDI, LiDCTA, $LiB(CN)_4$, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ or a combination thereof.

Embodiment 25. The solid ion conductive layer of any one of embodiments 1 to 24, comprising an average pore size of at most 50 microns, at most 45 microns, at most 40 microns, at most 35 microns, at most 30 microns, at most 25 microns, at most 20 microns, at most 17.5 microns, at most 15 microns, at most 12.5 microns, at most 10 microns at most 7.5 microns, or at most 5 microns.

Embodiment 26. The solid ion conductive layer of any one of embodiments 1 to 25, comprising an average pore size of at least 0.1 microns, at least 0.3 microns, at least 0.5 microns, at least 0.7 microns, at least 1 microns, at least 1.5 microns, at least 2 microns, at least 2.5 microns, at least 3 microns, at least 5 microns, at least 7.5 microns, at least 10 microns, at least 12.5 microns, porosity of at least 15 microns, at least 17.5 microns, at least 20 microns, at least 22 microns, at least 25 microns, at least 30 microns, at least 33 microns, at least 35 microns, at least 38 microns, at least 40 microns, at least 42 microns, porosity of at least 45 microns, at least 47 microns, or at least 50 um.

Embodiment 27. The solid ion conductive layer of any one of embodiments 1 to 26, comprising a total porosity including open pores, closed pores, or a combination thereof.

Embodiment 28. The solid ion conductive layer of embodiment 27, wherein at least 5% of pores of the total porosity are open, at least 10%, at least 20%, at least 30%, at least 40%, at least 50%, at least 60%, at least 70%, at least 80%, or at least 90% of pores of the total porosity are open.

Embodiment 29. The solid ion conductive layer of embodiment 27 or 28, wherein at most 95% of pores of the total porosity are open, at most 90%, at most 85%, at most 80%, at most 75%, at most 70%, at most 65%, at most 50%, at most 45%, at most 40%, at most 35%, at most 30%, at most 25%, at most 20%, at most 15%, at most 10%, or at most 5% of pores of the total porosity are open.

Embodiment 30. The solid ion conductive layer of any one of embodiments 27 to 28, wherein the total porosity consists essentially of open pores.

Embodiment 31. The solid ion conductive layer of any one of embodiments 27 to 29, wherein at least 0.5% of pores of the total porosity are closed, at least 1%, at least 3%, at least 4% or at least 5% of pores of the total porosity are closed.

Embodiment 32. The solid ion conductive layer of embodiment 31, wherein at most 10% of the total porosity are closed, at most 8%, at most 6%, at most 4%, at most 3%, at most 2%, or at most 1% of pores of the total porosity are closed.

Embodiment 33. The solid ion conductive layer of any one of embodiments 1 to 32, comprising a first type of porosity and a second type of porosity, wherein the first and second types of porosity comprises a different pore characteristic including average pore size, pore size distribution, pore orientation, a content of pores, or a combination thereof.

Embodiment 34. The solid ion conductive layer of embodiment 33, wherein the first type of porosity comprises a first average pore size and the second type of porosity comprises a second average pore size, wherein the first average pore size is greater than the second average pore size.

Embodiment 35. The solid ion conductive layer of embodiment 33 or 34, wherein the first type of porosity comprises open porosity, closed porosity, or a combination thereof.

Embodiment 36. The solid ion conductive layer of embodiment 35, wherein the first type of porosity consists of open pores.

Embodiment 37. The solid ion conductive layer of any one of embodiments 33 to 36, wherein the first type of porosity makes up at least 1 vol % for the total volume of the ion conductive layer, at least 5 vol %, at least 10 vol %, at least 15 vol %, at least 20 vol %, at least 25 vol %, at least 30 vol %, at least 40 vol %, at least 50 vol %, at least 55 vol %, at least 60 vol %, at least 70 vol %, at least 80 vol % or at least 90 vol % for the total volume of the ion conductive layer.

Embodiment 38. The solid ion conductive layer of any one of embodiments 33 to 37, wherein the first type of porosity makes up at most 95 vol % for the total volume of the ion conductive layer, at most 90 vol %, at most 80 vol %, at most 70 vol %, at most 60 vol %, at most 50 vol %, at most 40 vol %, at most 30 vol %, at most 20 vol %, or at most 10 vol % for the total volume of the ion conductive layer.

Embodiment 39. The solid ion conductive layer of any one of embodiments 33 to 38, wherein the first type of porosity comprises a first average pore size of at least 2 microns, at least 3 microns, at least 5 microns, at least 7 microns, at least 10 microns, at least 12 microns, at least 15 microns, or at least 17 microns.

Embodiment 40. The solid ion conductive layer of any one of embodiments 33 to 39, wherein the first type of porosity comprises a first average pore size of at most 50 microns, at most 45 microns, at most 40 microns, at most 35 microns, at most 30 microns, at most 25 microns, at most 20 microns, at most 17 microns, at most 15 microns, at most 12 microns, at most 10 microns at most 7 microns, or at most 5 microns.

Embodiment 41. The solid ion conductive layer of any one of embodiments 33 to 40, wherein the second type of porosity comprises open pores, closed pores, or a combination thereof.

Embodiment 42. The solid ion conductive layer of embodiment 41, wherein the second type of porosity consists essentially of open porosity.

Embodiment 43. The solid ion conductive layer of any one of embodiments 33 to 42, wherein the second type of pores comprises a second average pore size of at most 1 micron, at most 0.8 microns, or at most 0.5 microns.

Embodiment 44. The solid ion conductive layer of any one of embodiments 33 to 43, wherein the second type of pores comprises a second average pore size of at least 0.1 microns, at least 0.2 microns, at least 0.3 microns, or at least 0.5 microns.

Embodiment 45. The solid ion conductive layer of any one of embodiments 33 to 44, wherein the second type of porosity makes up at least 1 vol % for the total volume of the ion conductive layer, at least 2 vol %, at least 3 vol %, at least 4 vol %, at least 5 vol %, at least 6 vol %, at least 7 vol %, at least 8 vol %, at least 9 vol %, at least 10 vol %, at least 12 vol %, or at least 15 vol % for the total volume of the ion conductive layer.

Embodiment 46. The solid ion conductive layer of any one of embodiments 33 to 45, wherein the second type of porosity makes up at most 30 vol % for the total volume of the ion conductive layer, at most 28 vol %, at most 25 vol %, at most 23 vol %, at most 20 vol %, at most 18 vol %, at most 15 vol %, at most 12 vol %, at most 10 vol %, %, at most 8 vol %, at most 7 vol %, at most 6 vol %, at most 5 vol %, at most 4 vol %, or at most 3 vol % for the total volume of the ion conductive layer.

Embodiment 47. The solid ion conductive layer of any one of embodiments 27 to 46, wherein at least 50%, at least 60%, at least 70%, at least 80%, or at least 90% of pores of the total porosity have pore sizes within ±30% of the average pore size, within ±25% of the average pore size, within ±20% of the average pore size, within ±15% of the average pore size, or within ±10% of the average pore size, within ±5% of the average pore size.

Embodiment 48. The solid ion conductive layer of any one of embodiments 33 to 47, wherein at least 50%, at least 60%, at least 70%, at least 80%, or at least 90% of pores of the first type porosity have pore sizes within ±30% of the first average pore size, within ±25% of the first average pore size, within ±20% of the first average pore size, within ±15% of the first average pore size, within ±10% of the first average pore size, or within ±5% of the first average pore size.

Embodiment 49. The solid ion conductive layer of any one of embodiments 33 to 48, wherein the pores of the first and second types of porosity independently comprise an aspect ratio of length:width of at least 1, at least 1.2, at least 1.5, at least 2, at least 2.3, at least 2.5, at least 2.8, or at least 3.

Embodiment 50. The solid ion conductive layer of embodiment 49, wherein the average aspect ratio is at most 30, at most 25, at most 22, at most 20, at most 15, at most 12, at most 10, at most 8, at most 5, or at most 4.

Embodiment 51. The ion solid conductive layer of any one of embodiments 33 to 50, wherein the first porosity comprises horizontally oriented pores.

Embodiment 52. The ion solid conductive layer of any one of embodiments 33 to 51, wherein the first porosity consists essentially of horizontally oriented pores.

Embodiment 53. The ion solid conductive layer of any one of embodiments 1 to 52, wherein the foamed matrix consists of the electrolyte material and a polymer including polyurethane, epoxy, or a combination thereof.

Embodiment 54. The solid ion conductive layer of any one of embodiments 1 to 53, wherein the electrolyte material comprises a halide-based material, a sulfide-based material, or a combination thereof.

Embodiment 55. The solid ion conductive layer of embodiment 54, wherein the halide-based material comprises $M_{3-\delta}(Me^{k+})_f X_{3-\delta+k*f}$, wherein $-3 \leq \delta < 3$, $0 \leq f \leq 1$, k is the valence of Me, $2 \leq k < 6$, M includes an alkali metal element, Me includes a metal element that is different from M, and X includes a halogen.

Embodiment 56. The solid ion conductive layer of embodiment 54, wherein the electrolyte material comprises a lithium halide with an anti-perovskite structure, a lithium oxyhalide, a lithium halide hydroxide, or a combination thereof.

Embodiment 57. The solid ion conductive layer of embodiment 56, wherein the electrolyte material comprises $Li_3OCl$, $Li_3OBr$, $Li_3O(Cl, Br)$, $Li_3OCl_{0.5}Br_{0.5}$, $Li_2OHX$, $Li_2OHCl$, $Li_2OHBr$, or a combination thereof.

Embodiment 58. The solid ion conductive layer of embodiment 54, wherein the sulfide comprises $xLi_2S$-$yP_2S_5$ (LPS) including $0.67Li_2S$-$0.33P_2S_5$, $80Li_2S$-$20P_2S_5$, $75Li_2S$-$25P_2S_5$, or $70Li_2S$-$30P_2S_5$, $Li_2S$—X, wherein X represents at least one sulfide of $SiS_2$, $GeS_2$, and $B_2S_3$, including $0.50Li_2S$-$0.50GeS_2$, $LiI$—$Li_2S$—$SiS_2$ including $0.40LiI$-$0.36Li_2S$-$0.24SiS_2$, $0.05Li_4SiO_4$-$0.57Li_2S$-$0.38SiS_2$, $Li_3PO_4$—$Li_2S$—$SiS_2$ including $0.01Li_3PO_4$-$0.63Li_2S$-$0.36SiS_2$, $LiI$—$Li_2S$—$B_2S_3$ including $0.44LiI$-$0.30Li_2S$-$0.26B_2S_3$, $LiI$—$Li_2S$—$P_2S_5$ including $0.45LiI$-$0.37Li_2S$-$0.18P_2S_5$, $a$-$Li_3PS_4$, $Li_{10}GeP_2S_{12}$, $Li_6PS_5Cl$, $Li_6PS_5Br$, $Li_{9.54}Si_{1.74}P_{1.44}S_{11.7}Cl_{0.3}$, $Li_{10.35}[Sn_{0.27}Si_{1.08}]P_{1.65}S_{12}$, or any combination thereof.

Embodiment 59. The solid ion conductive layer of any one of embodiments 1 to 58, comprising at least 5 vol % of the electrolyte material for the total volume of the ion conductive layer, at least 7 vol %, at least 9 vol %, at least 10 vol %, at least 12 vol %, at least 15 vol %, at least 17 vol %, at least 19 vol %, at least 20 vol %, at least 25 vol %, at least 27 vol %, or at least 30 vol % for the total volume of the ion conductive layer.

Embodiment 60. The solid ion conductive layer of any one of embodiments 1 to 59, comprising at most 60 vol % of the electrolyte material for the total volume of the ion conductive layer, at most 58 vol %, at most 55 vol %, at most 50 vol %, at most 48 vol %, at most 45 vol %, at most 42 vol %, at most 40 vol %, at most 38 vol %, at most 35 vol %, at most 30 vol %, at most 28 vol %, at most 25 vol %, at most 20 vol %, at most 15 vol %, at most 10 vol %, or at most 5 vol % for the total volume of the ion conductive layer.

Embodiment 61. The solid ion conductive layer of any one of embodiments 1 to 60, further comprising lithium metal dispersed in the foamed matrix.

Embodiment 62. An anode, comprising the ion conductive layer of embodiment 61, wherein the anode has a specific weight energy density at least 650 mAh/g, at least 700 mAh/g, at least 750 mAh/g, at least 800 mAh/g, at least 850 mAh/g, or at least 900 mAh/g, when the anode is fully charged with Li metal.

Embodiment 63. A battery, comprising the ion conductive layer of any one of embodiments 1 to 60.

Embodiment 64. A battery, comprising the anode of embodiment 62.

Embodiment 65. The battery of embodiment 63 or 64, comprising an energy density of at least 600 Wh/L, at least 650 Wh/L, at least 700 Wh/L, at least 750 Wh/L, at least 800 Wh/L, or at least 850 Wh/L.

Embodiment 66. The battery of embodiment 63 or 64, comprising an energy density of at least 250 Wh/kg, at least 300 Wh/kg, at least 350 Wh/kg, or at least 400 Wh/kg.

Embodiment 67. A multi-layer structure, comprising a first ion conductive layer having a porosity of less than 5 vol % for the total volume of the first ion conductive layer; and a second ion conductive layer overlying the first ion conductive layer, wherein the second ion conductive layer comprises at least one ion conductive layer of any one of embodiments 1 to 61.

Embodiment 68. The multi-layer structure of embodiment 67, wherein the at least one ion conductive layer comprises a plurality of the ion conductive layers, wherein the plurality of the ion conductive layers comprises different pore characteristics including porosity, average pore size, or a combination thereof.

Embodiment 69. The multi-layer structure of embodiment 68, wherein the second ion conductive layer comprises a graded porosity constituted of pores of the plurality of the ion conductive layers.

Embodiment 70. The multi-layer structure of embodiment 68, wherein the second ion conductive layer comprises increased average pore sizes, increased porosity, or a combination thereof in the direction extending away from the first ion conductive layer.

Embodiment 71. A composition, comprising a solid electrolyte material including a hygroscopic material and a foaming agent.

Embodiment 72. The composition of embodiment 71, further comprising an organic material precursor, wherein the organic material precursor is hydrophobic.

Embodiment 73. The composition of embodiment 71, further comprising an organic material precursor having an HLB value of at most 5, a Reactivity Value of at most 10%, a MAR of at most 1.0 wt. %, or a combination thereof.

Embodiment 74. The composition of embodiment 72 or 73, wherein the organic material precursor comprises epoxy resin, polyol, or a combination thereof.

Embodiment 75. The composition of any one of embodiments 71 to 74, further comprising a cross-linking agent including an HLB value of at most 5, a Reactivity Value of at most 10%, a MAR of at most 1.0 wt. %, or a combination thereof.

Embodiment 76. The composition of embodiment 75, wherein the cross-linking agent comprises isocyanate 370, hexamethylene diisocyanate (HDI), isophorone diisocyanate, hydrophobic polyisocyanates, amine, thiol, or a combination thereof.

Embodiment 77. The composition of any one of embodiments 71 to 76, wherein the foaming agent comprises cyclopentane, pentane, isopentane, methylene diphenyl diisocyanate.

Embodiment 78. The composition of any one of embodiments 71 to 77, comprises at least 50 wt. % to at most 85 wt. % of the electrolyte material for the total weight of the composition.

Embodiment 79. The composition of any one of embodiments 71 to 78, wherein the electrolyte material comprises a halide-based material, a sulfide-based material, or a combination thereof.

Embodiment 80. The composition of any one of embodiments 71 to 79, comprising at least 2 wt. % to at most 10 wt. % of the foaming agent for the total weight of the composition.

Embodiment 81. The composition of any one of embodiments 71 to 80, comprising at least 5 wt. % to at most 20 wt. % of the organic material precursor for the total weight of the composition.

Embodiment 82. The composition of any one of embodiments 71 to 81, comprising at least 5 wt. % to at most 20 wt. % of the cross-linking agent for the total weight of the composition.

Embodiment 83. A slurry, comprising the composition of any one of embodiments 71 to 82.

Embodiment 84. A colloidal suspension, comprising the composition of any one of embodiments 71 to 82.

Embodiment 85. A process, comprising:
forming a mixture comprising an electrolyte material including a hygroscopic material and a foaming agent; and
forming a foamed matrix from the mixture.

Embodiment 86. The process of embodiment 85, wherein the mixture further comprises an organic material precursor and a cross-linking agent.

Embodiment 87. The process of embodiment 85 or 86, further comprising performing a foaming reaction forming the foamed matrix including an organic material formed from the organic material precursor.

Embodiment 88. The process of any one of embodiments 85 to 87, wherein each of the foaming agent and the cross-linking agent comprises an HLB value of at most 5, a Reactivity Value of at most 10%, a MAR of at most 1.0 wt. %, or a combination thereof.

Embodiment 89. The process of any one of embodiments 85 to 88, wherein the organic material precursor is hydrophobic.

Embodiment 90. The process of any one of embodiments 85 to 89, wherein the organic material comprises an HLB value of at most 5, a Reactivity Value of at most 10%, a MAR of at most 1.0 wt. %, or a combination thereof.

Embodiment 91. The process of any one of embodiments 85 to 90, wherein the organic material precursor comprises epoxy resin, polyol, or a combination thereof.

Embodiment 92. The process of any one of embodiments 85 to 91, wherein the cross-linking agent comprises isocyanate 370, hexamethylene diisocyanate (HDI), isophorone diisocyanate, hydrophobic polyisocyanates, amine, thiol, or a combination thereof.

Embodiment 93. The process of any one of embodiments 85 to 92, wherein the foaming agent comprises cyclopentane, pentane, isopentane, methylene diphenyl diisocyanate, or a combination thereof.

Embodiment 94. The process of any one of embodiments 85 to 93, further comprising forming a film or a tape including the mixture, wherein foaming is performed in the film or in the tape.

Embodiment 95. The process of embodiment 94, wherein the film or tape is formed by extruding, calendaring, printing, or casting the mixture.

Embodiment 96. The process of embodiment 94 or 95, wherein the film or the tape is a first green layer, wherein the process further comprises forming a second green layer, wherein the second green layer overlies the first green layer.

Embodiment 97. The process of embodiment 96, wherein the first green layer is formed simultaneously while forming the second green layer.

Embodiment 98. The process of embodiment 96, further comprising laminating the first and the second green layers.

Embodiment 99. The process of any one of embodiments 85 to 98, wherein the foaming reaction is performed at a temperature of at least 40° C. and at most 80° C.

Embodiment 100. The process of embodiment 99, wherein the foaming reaction is performed at a temperature higher than the forming temperature of the film or tape.

Embodiment 101. The process of any one of embodiments 85 to 100, further comprising simultaneously constraining a thickness of the film or tape while performing the foaming reaction.

Embodiment 102. The process of any one of embodiments 99 to 101, further comprising curing the mixture in the green layer to form a solid ion conductive layer, wherein curing is performed at a temperature from 20° C. to 150° C.

Embodiment 103. The process of any one of embodiments 96 to 102, further comprising forming a dense electrolyte layer from the second green layer (Original) An armor component comprising:
a body including:
a first portion including at least about 90 wt. % calcium boride compounds and having a density of at least about 80% theoretical density, wherein the calcium boride compounds include non-stoichiometric calcium boride ($CaB_x$) and stoichiometric calcium boride ($CaB_6$).

EXAMPLES

Example 1

A porous solid ion conductive layer can be formed according to embodiments herein using the mixture having the composition included in Table 1. The casted tape can be heated to ~55° C. where the foaming reaction of cyclopentane starts. As the forming reaction is exothermic, the tape temperature rises further as the foaming reaction proceeds. At around 70° C. crosslinking of Isocyanate and VORAPEL takes place forming the porous polyurethane structure.

TABLE 1

| Formulation | Wt. % |
| --- | --- |
| Dow Hydrophobic Polyol VORAPEL ™ D3201 (polyol) | 12 |
| Isocyanate 370 (crosslinking agent) | 15 |
| Cyclopentane (blowing agent) | 3.5 |
| Electrolyte material | 69.5 |

Example 2

A porous solid ion conductive layer can be formed according to embodiments herein using the mixture having the composition included in Table 2. Even though some contents are provided in ranges in Table 2, it is to be understood the contents of the ingredients add up to 100%. The casted tape can be heated to ~40° C. where the foaming reaction of pentane starts. As the forming reaction is exothermic, the tape temperature rises further as the foaming reaction proceeds. The hardening of the epoxy starts soon after forming the porous epoxy framework.

TABLE 2

| Formulation | Wt. % |
| --- | --- |
| DER 331 Epoxy | 12 |
| Ancamine1922A (amine) or Gabepro 800 (Thiol) (hardener for epoxy) | 8-12 |
| pentane (blowing agent) | 5-7 |
| Ceramic powder | ~70 |

Example 3

A porous solid ion conductive layer can be formed according to embodiments herein using the mixture having the composition included in Table 3. Araldite® casting system and Capcure® 3800 may be mixed at a ratio of 10:18. Even though some contents are provided in ranges in Table 3, it is to be understood the contents of the ingredients add up to 100%. Foaming and crosslinking can be conducted in the casted tape following the manufacturer's instructions.

TABLE 3

| Formulation | Wt. % |
| --- | --- |
| Araldite ® casting system (CY221 and HY2966) | 8-13 |
| Capcure ® 3800 | 14-24 |
| Pentane (blowing agent) | 3-7 |
| Ceramic powder | ~70 |

Example 4

Each of the binder materials in Table 4 below was mixed with $Li_3YBr_6$ powder for forming a solid ion conductive layer.

PVC powder and plasticizer, Diisononyl phthalate (DINP), was pre-mixed so that the mixture included 40 wt. % of PVC and 60 wt. % of DINP for the total weight of the pre-mixture. The pre-mixture of PVC and DINP was then mixed with $Li_3YBr_6$ powder, wherein the $Li_3YBr_6$ powder is at 60 wt. % and the pre-mixture of PVC and DINP is at 40 wt. % for the total mixture of $Li_3YBr_6$ and the pre-mixture. Azodicarbonamide (e.g., CelChem LLC Celgogen 780) was used as a blowing agent and added to the mixture of PVC, DINP, and $Li_3YBr_6$. The mixture was tape cast into a sheet that was heated at 150 to 200° C. to allow PVC to fuse and cooled down to form $Li_3YBr_6$-PVC foam.

XRD analysis of the mixture of $Li_3YBr_6$ and DINP suggested minor decomposition of $Li_3YBr_6$ and a low level of formation of lithium bromide. The Reactivity Value of DINP is less than 10%, and it is considered that DINP and $Li_3YBr_6$ are chemically compatible. XRD analysis of the mixture of $Li_3YBr_6$ and PVC suggested PVC is chemically compatible with $Li_3YBr_6$.

TABLE 4

| Polymer Matrix | Compatibility with LYB | Curability |
| --- | --- | --- |
| PVC (PVC + DINP Plasticizer) | Yes | Yes |
| Silicone-epoxy and Catalyst-$B(C_6F_5)_3$ | Yes | No |
| Silicone and Catalyst-Sn | No | No |
| Silicone HCR and Catalyst-Peroxide | No | No |
| Silicone and Catalyst-Pt | Yes | No |
| Silicone and Catalyst-Pt (high concentration) | Yes | Yes |

Silicone-epoxy was pre-mixed with the catalyst at a weight ratio of 99 wt. % of silicone:1 wt. % of $B(C_6F_5)_3$. The pre-mixture is then mixed with $L_3YBr_6$ so that the pre-mixture is at 70 wt. % and $Li_3YBr_6$ is at 30 wt. % for the total of the premixture and $Li_3YBr_6$. It was noted that the mixture of silicone-epoxy, catalyst $B(C_6F_5)_3$, and $Li_3YBr_6$ powder was not able to fully cure at the curing conditions for silicone-epoxy, 120° C. for 30 min, and the mixture was not able to fully cure when the amount of the catalyst increased.

Silicone high consistency rubber (HCR) (Nouryon Silicone Gum RB6-0902) and the catalyst, peroxide, was pre-mixed with the catalyst at a weight ratio of 97 wt. % of silicone HCR:3 wt. % of peroxide. The pre-mixture is then mixed with $Li_3YBr_6$ so that the pre-mixture is at 70 wt. % and $Li_3YBr_6$ is at 30 wt. % for the total of the premixture and $Li_3YBr_6$. It was also noted the mixture of silicone HCR and the catalyst, peroxide (Nouryon Peroxide PD-50-S-PS), and $Li_3YBr_6$ powder was not able to fully cure and the XRD patterns of the mixture of silicone HCR, peroxide, and $Li_3YBr_6$ demonstrated characteristic peaks of LiBr, indicating the decomposition of $Li_3YBr_6$.

The pre-mixture of silicone and the catalyst, Sn (Nusil RT foam silicone R-2370) was mixed with $Li_3YBr6$. The mixture was not able to fully cure, and the XRD analysis on the mixture suggested the decomposition of $Li_3YBr_6$.

The pre-mixture of silicone and the catalyst of Pt (Nusil RT foam silicone R-2360) was mixed with $Li_3YBr_6$ at a weight percentage ratio of 50 wt. % of pre-mixture:50 wt. % of Li3YBr6. The XRD analysis on the mixture indicates no decomposition of Li3YBr6 and the silicon and Pt catalyst is chemically compatible. The content of Pt in the premixture is 50 ppm relative to the weight of silicone. The mixture was not able to fully cure. Further analysis indicated impurity, ammonium bromide in the Li3YBr6 powder could have an effect on curing. An additional amount of Pt from 400 to 5000 ppm was added to the previous mixture of silicon, Pt catalyst, and Li3YBr6, and the new mixtures were able to cure at a temperature of 20 to 70° C. for 5 to 20 minutes when Pt content was increased to 600 ppm and above.

Example 5

A solid ion conductive layer including 65 wt. % of $Li_3YBr_6$ and 35 wt. % of a foamed polysiloxane matrix was formed using two-part liquid silicone rubber (LSR). The below process was performed in the glove box.

For the two-part liquid silicone rubber (LSR), 45 wt. % Li3YBr6 was uniformly dispersed in 55 wt. % Part A. Part A includes vinyl silicone, the catalyst Pt and blowing agent (silanol). 69 wt. % Li3YB6 was uniformly dispersed in 31 wt. % Part B. Part B includes vinyl silicone and cross-linking agent (hydride silicone). Li3YBr6-Part A pre-mixture and Li3YBr6-Part B pre-mixture was combined. The final mixture was used to tape cast films having a thickness from 50 um to 300 um. The films were heated at 60° C. to 100° C. and dwell for up to 10 min to allow foaming and curing to occur simultaneously. When Pt is present, silanol (blow agent in Part A) reacts with hydride silicone (in Part B) to generate hydrogen gas for foaming. Meanwhile, vinyl silicone (in both Part A and Part B) reacts with hydride silicone (crosslinker in Part B) to form silicone rubber. The films are then allowed to cool down forming a solid ion conductive layer including $Li_3YBr_6$ in silicone foam.

Example 6

TABLE 5

| Component | Function | Concentration |
|---|---|---|
| Divinyl PDMS | Base resin | 30-80 wt. % |
| PDMS-co-PHMS | Crosslinker; H2 source | 2-30 wt. % |
| Mono- or Di-Functional Silanol, or benzyl alcohol | H2 Blowing Agent | Up to 20 wt. % |
| Platinum | Catalyst | 10 ppm to 1000 ppm |

Foamed sheets are formed with a platinum-based silicone foaming system including the components noted in Table 10 with a halide-based ion conductive material. The components are pre-mixed, and the pre-mixtures are mixed with the halide-based ion conductive material at a weight ratio of pre-mixture to halide-based ion conductive material of 0.1 wt. %:99.9 wt. %, 0.5 wt. %:99.5 wt. %, 1 wt. %: 99 wt. %, 1.5 wt. %: 98.5 wt. %, 2 wt. %:98 wt. %, 3 wt. %: 98 wt. %, 4 wt. %:96 wt. %, 5 wt. %:95 wt. %, 6 wt. %: 94 wt. %, 7 wt. %:93 wt. %, 8 wt. %:92 wt. %, 9 wt. %:91 wt. %, and 10 wt. %: 90 wt. % to form the ion conductive layers.

Benefits, other advantages, and solutions to problems have been described above with regard to specific embodiments. However, the benefits, advantages, solutions to problems and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include a range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A solid ion conductive layer, comprising a foamed matrix including an electrolyte material including a halide-based material represented by formula $M_{3-\delta}(Me^{k+})_f X_{3-\delta+k*f}$, wherein the halide-based material is complexed with ammonium halide, and wherein $-3 \leq \delta < 3$, $0 < f \leq 1$, k is a valence of Me, $2 \leq k < 6$, M includes an alkali metal element including Li, Me includes a metal element that is different from M, and X includes a halogen.

2. The solid ion conductive layer of claim 1, wherein the foamed matrix comprises an organic material, wherein the organic material is at a content of at least 0.5 vol % and at most 50 vol % for a total volume of the solid ion conductive layer.

3. The solid ion conductive layer of claim 1, wherein the foamed matrix comprises a polymer including siloxane.

4. The solid ion conductive layer of claim 1, wherein the foamed matrix comprises polydimethylsiloxane or polyvinyl chloride.

5. The solid ion conductive layer of claim 3, comprising platinum embedded within the foamed matrix.

6. The solid ion conductive layer of claim 1, comprising at least 10 ppm to at most 1 wt. % of platinum for a total weight of the foamed matrix.

7. The solid ion conductive layer of claim 1, comprising an inert metal embedded in the foamed matrix.

8. The solid ion conductive layer of claim 1, wherein the foamed matrix comprises an organic material including a polymer, wherein the polymer has an HLB number of at most 10, Reactivity Value of at most 20%, or a combination thereof.

9. The solid ion conductive layer of claim 1, wherein the foamed matrix comprises an organic material including a polymer including epoxy, polyurethane, poly(ethylene), poly(ethylene oxide), or a combination thereof.

10. The solid ion conductive layer of claim 1, comprising a total porosity of at least 30 vol % and at most 95 vol % for a total volume of the solid ion conductive layer.

11. The solid ion conductive layer of claim 1, wherein the foamed matrix comprises a porosity including pores having an average pore size of at least 0.1 microns and at most 50 microns.

12. The solid ion conductive layer of claim 1, further comprising lithium metal dispersed in the foamed matrix.

13. The solid ion conductive layer of claim 1, wherein the foamed matrix comprises polyvinyl chloride.

14. The solid ion conductive layer of claim 1, wherein the solid ion conductive layer comprises at least 15 vol % and at most 95 vol % of the electrolyte material for a total volume of the solid ion conductive layer.

15. The solid ion conductive layer of claim 3, wherein the polymer comprises polydimethylsiloxane.

16. The solid ion conductive layer of claim 3, wherein the polymer comprises vinyl-terminated polydimethylsiloxane, hydride functional siloxanes, methylhydrosiloxane-dimethylsiloxane copolymer, or a combination thereof.

17. The solid ion conductive layer of claim 1, comprising a thickness of at least 1 micron.

18. The solid ion conductive layer of claim 15, comprising at least 10 ppm to at most 1 wt. % of platinum for a total weight of the foamed matrix.

19. The solid ion conductive layer of claim 15, wherein the foamed matrix comprises a porosity including pores having an average pore size of at least 0.5 microns and at most 10 microns.

20. The solid ion conductive layer of claim 15, further comprising lithium metal dispersed in the foamed matrix.

\* \* \* \* \*